US011496924B2

(12) United States Patent
Chen et al.

(10) Patent No.: US 11,496,924 B2
(45) Date of Patent: Nov. 8, 2022

(54) MEDIUM ACCESS CONTROL (MAC) PROTOCOL DATA UNIT (MPDU) AND CODEWORD ALIGNMENT AND VALIDATION

(71) Applicant: QUALCOMM Incorporated, San Diego, CA (US)

(72) Inventors: Jialing Li Chen, San Diego, CA (US); Alfred Asterjadhi, San Diego, CA (US); Stephen Jay Shellhammer, Ramona, CA (US); Dung Ngoc Doan, San Diego, CA (US); Bin Tian, San Diego, CA (US); George Cherian, San Diego, CA (US); Abhishek Pramod Patil, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 36 days.

(21) Appl. No.: 16/917,225

(22) Filed: Jun. 30, 2020

(65) Prior Publication Data

US 2021/0007006 A1    Jan. 7, 2021

Related U.S. Application Data

(60) Provisional application No. 62/869,949, filed on Jul. 2, 2019.

(51) Int. Cl.
*H04W 28/04*   (2009.01)
*H04L 1/00*    (2006.01)
*H04L 1/18*    (2006.01)

(52) U.S. Cl.
CPC ........... *H04W 28/04* (2013.01); *H04L 1/0013* (2013.01); *H04L 1/0063* (2013.01); *H04L 1/1812* (2013.01)

(58) Field of Classification Search
CPC .... H04W 28/04; H04L 1/0063; H04L 1/1812; H04L 1/0013; H04L 1/1887;
(Continued)

(56) References Cited

U.S. PATENT DOCUMENTS

| 2009/0074088 A1* | 3/2009 | Tao | ...................... H04L 1/0007 375/260 |
| 2012/0106575 A1* | 5/2012 | Oh | ........................ H04L 1/0068 370/474 |

(Continued)

*Primary Examiner* — Ajit Patel
*Assistant Examiner* — Wilfred Thomas
(74) *Attorney, Agent, or Firm* — Holland & Hart LLP

(57) ABSTRACT

This disclosure provides methods, devices and systems of wireless communication in accordance with hybrid automatic repeat request (HARQ) techniques. Some implementations more specifically relate to aligning aggregate medium access control (MAC) protocol data unit (A-MPDU) subframes with codeword boundaries in a physical-layer service data unit (PSDU). The alignment may be performed by selectively adding padding bits to the PSDU based on the size of each A-MPDU subframe and the lengths of the codewords. In some aspects, an A-MPDU subframe may be aligned with a first codeword of the PSDU so that the first A-MPDU subframe is encoded exclusively within the first codeword. In some other aspects, an A-MPDU subframe may be aligned with two or more contiguous codewords of the PSDU so that the two or more contiguous codewords include the A-MPDU subframe and no portions of any other A-MPDU subframe.

11 Claims, 27 Drawing Sheets

(58) Field of Classification Search
CPC ... H04L 1/1614; H04L 69/321; H04L 1/0041; H04L 1/0061
See application file for complete search history.

(56) References Cited

U.S. PATENT DOCUMENTS

| | | | |
|---|---|---|---|
| 2014/0233483 A1* | 8/2014 | You | H03M 13/353 |
| | | | 370/329 |
| 2017/0181187 A1* | 6/2017 | Asterjadhi | H04W 74/006 |
| 2017/0353887 A1* | 12/2017 | Kim | H04L 1/1614 |
| 2018/0034593 A1* | 2/2018 | Xu | H03M 13/6306 |
| 2018/0242298 A1* | 8/2018 | Choi | H04L 29/06068 |
| 2019/0326934 A1* | 10/2019 | Kim | H04L 1/0061 |
| 2019/0342916 A1* | 11/2019 | Liu | H04W 74/0808 |
| 2019/0372718 A1* | 12/2019 | Lomayev | H04L 1/0643 |
| 2020/0008267 A1* | 1/2020 | Noh | H04W 80/08 |
| 2020/0153558 A1* | 5/2020 | Sugaya | H04L 1/1819 |
| 2020/0252156 A1* | 8/2020 | Lomayev | H04L 1/0057 |
| 2020/0389259 A1* | 12/2020 | Zhang | H04L 1/0061 |

* cited by examiner

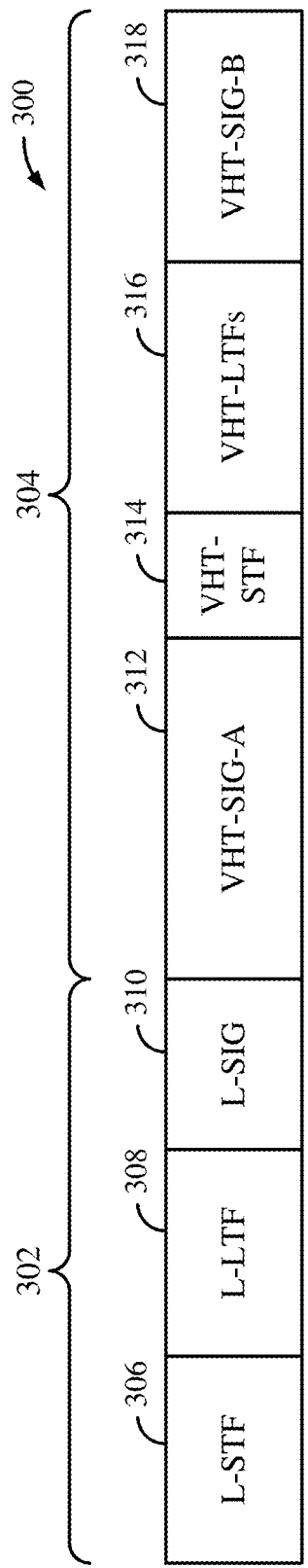
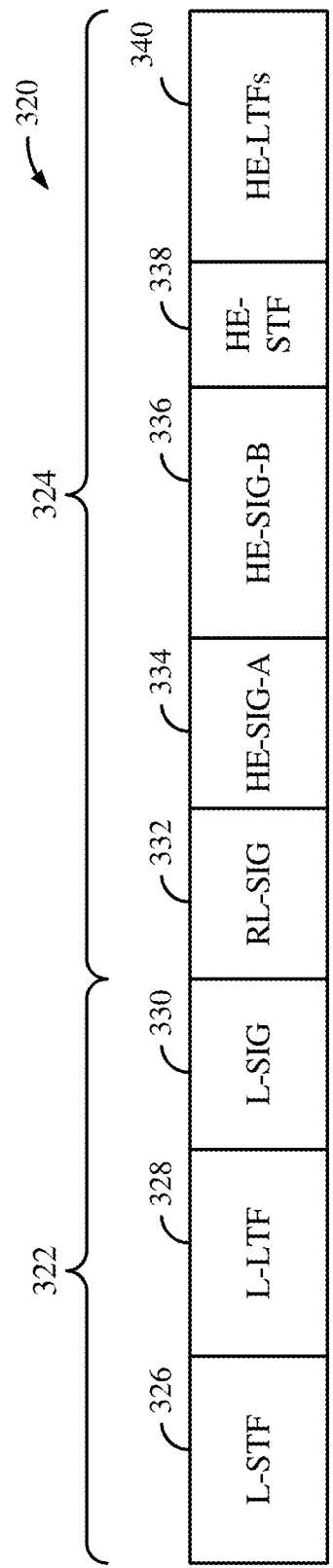
Figure 3A
Figure 3B

830 ⟶

```
Generating one or more cyclic redundancy check (CRC)
sequences based on a plurality of payload bits associated with the
PSDU, where the one or more CRC sequences is encoded with the
plurality of payload bits to produce the one or more codewords.
(832)
```

↓

```
Grouping the one or more codewords into one or more codeword
groups, where the one or more CRC sequences includes a
respective CRC sequence of reach of the one or more codeword
groups. (834)
```

┌─────────────────────────────────────────────────────────────┐
│ Receiving, from a transmitting device, a physical-layer protocol │
│ data unit (PPDU) including one or more codewords. (902)      │
└─────────────────────────────────────────────────────────────┘
                              ↓
┌─────────────────────────────────────────────────────────────┐
│ Decoding the received codewords to recover a payload of the │
│ PPDU, where the decoded codewords include one or more cyclic │
│ redundancy check (CRC) sequences. (904)                      │
└─────────────────────────────────────────────────────────────┘
                              ↓
┌─────────────────────────────────────────────────────────────┐
│ Validating the decoded codewords, in a physical (PHY) layer of │
│ the wireless communication device, based on the one or more │
│ CRC sequences. (906)                                         │
└─────────────────────────────────────────────────────────────┘

┌─────────────────────────────────────────────────────────────┐
│ Determining, based on the CRC sequences, that one or more of │
│ the codewords or groups of codewords were not correctly decoded │
│ by the wireless communication device. (912)                  │
└─────────────────────────────────────────────────────────────┘
                              ↓
┌─────────────────────────────────────────────────────────────┐
│ Transmitting, to the transmitting device, a hybrid automatic repeat │
│ request (HARQ) feedback frame identifying the one or more   │
│ codewords or groups of codewords that were not correctly    │
│ decoded. (914)                                               │
└─────────────────────────────────────────────────────────────┘

*Figure 9B*

| Range of $N_{avbits}$ (bits) | Number of LDPC codewords ($N_{CW}$) | LDPC codeword length $L_{LDPC}$ (bits) |
|---|---|---|
| $N_{avbits} \leq 648$ | 1 | 1296, if $N_{avbits} \geq N_{pld} + 912 \times (1-R)$ 648, otherwise |
| $648 < N_{avbits} \leq 1296$ | 1 | 1944, if $N_{avbits} \geq N_{pld} + 1464 \times (1-R)$ 1296, otherwise |
| $1296 < N_{avbits} \leq 1944$ | 1 | 1944 |
| $1944 < N_{avbits} \leq 2592$ | 2 | 1944, if $N_{avbits} \geq N_{pld} + 2916 \times (1-R)$ 1296, otherwise |
| $2592 < N_{avbits}$ | $\left\lceil \dfrac{N_{pld}}{1944 \cdot R} \right\rceil$ | 1944 |

Case 1: Entire A-MPDU is within one or two CWs. No MAC padding is used for such a short packet Case 2: Multiple CWs, each of length 1944. Add MAC padding to align MPDU/CW

*Figure 13A*

| Range of $N_{avbits}$ (bits) | Number of LDPC codewords ($N_{CW}$) | LDPC codeword length $L_{LDPC}$ (bits) |
|---|---|---|
| $N_{avbits} \leq 648$ | 1 | 1296, if $N_{avbits} \geq N_{pld} + 912 \times (1-R)$ 648, otherwise |
| $648 < N_{avbits} \leq 1296$ | 1 | 1944, if $N_{avbits} \geq N_{pld} + 1464 \times (1-R)$ 1296, otherwise |
| $1296 < N_{avbits} \leq 1944$ | 1 | 1944 |
| $1944 < N_{avbits} \leq 2592$ | 2 | 1944, if $N_{avbits} \geq N_{pld} + 2916 \times (1-R)$ 1296, otherwise |
| $2592 < N_{avbits}$ | $\left\lceil \dfrac{N_{pld}}{1944 \cdot R} \right\rceil$ | 1944 |

Rows 1–4: Very short packets could rely on FCS validation
Row 5: Long packets needs validation every CW (group)

*Figure 15A*

MEDIUM ACCESS CONTROL (MAC) PROTOCOL DATA UNIT (MPDU) AND CODEWORD ALIGNMENT AND VALIDATION

CROSS-REFERENCE TO RELATED APPLICATIONS

This patent application claims priority to U.S. Provisional Patent Application No. 62/869,949 entitled "MPDU AND CODEWORD ALIGNMENT AND VALIDATION FOR HARQ" and filed on Jul. 2, 2019, which is assigned to the assignee hereof. The disclosures of all prior applications are considered part of and are incorporated by reference in this patent application.

TECHNICAL FIELD

This disclosure relates generally to wireless communication, and more specifically, to aligning medium access control (MAC) protocol data units (MPDUs) with physical-layer codewords.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Imperfect channel conditions on the wireless communication medium may cause data loss during wireless data transmissions from a transmitting device to a receiving device. If the receiving device does not receive (or cannot decode) one or more portions of the transmitted data, the transmitting device may retransmit the one or more portions of data until received and properly decoded by the receiving device. Data retransmissions may consume time and limited resources of the wireless communication medium, and therefore it is desirable to minimize the number of such data retransmissions.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may be performed by a wireless communication device, and may include determining a codeword length to be used for encoding a physical-layer protocol service data unit (PSDU); determining a size of a first aggregate medium access control (MAC) protocol data unit (A-MPDU) subframe to be included in the PSDU, where the first A-MPDU subframe includes a first MAC protocol data unit (MPDU); aligning the first A-MPDU subframe with one or more codewords of the PSDU, where the alignment of the first A-MPDU includes selectively adding one or more padding bits to the PSDU based on the determined codeword length and the size of the first A-MPDU subframe; and encoding the PSDU, including the first A-MPDU subframe, as one or more codewords having the determined codeword length.

In some implementations, the alignment of the first A-MPDU subframe includes aligning the first A-MPDU subframe with a first codeword of the PSDU, where the first A-MPDU subframe is encoded exclusively within the first codeword based on the alignment. In some implementations, the method further includes aligning a second A-MPDU subframe with a second codeword of the PSDU, where the first and second A-MPDU subframes are encoded in different codewords based on the alignment of the second A-MPDU subframe. In some other implementations, the alignment of the first A-MPDU subframe includes aligning the first A-MPDU subframe with two or more contiguous codewords of the PSDU, where the two or more contiguous codewords include the first A-MPDU subframe, and no portions of any other A-MPDU subframe, based on the alignment.

In some implementations, the selective adding of the one or more padding bits includes inserting the padding bits between two or more A-MPDU subframes associated with the PSDU. In some instances, the padding bits include one or more MPDU delimiters. In some other instances, the padding bits include a known bit sequence.

In some implementations, the method further includes subdividing at least one of a MAC service data unit (MSDU), an aggregate MSDU (A-MSDU), or a MAC management protocol data unit (MMPDU) into two or more fragments based on the codeword length, where the at least one MSDU, A-MSDU, or MMPDU is included in the first A-MPDU subframe. In some implementations, the alignment of the first A-MPDU subframe includes aligning at least one of the fragments with a first codeword of the PSDU, where the at least one fragment is encoded exclusively within the first codeword based on the alignment. In some other implementations, the alignment of the first A-MPDU subframe includes aligning at least one of the fragments with two or more contiguous codewords of the PSDU, where the two or more contiguous codewords includes the at least one fragment, and no portions of any other fragment, based on the alignment. In some other implementations, the method further includes aggregating a plurality of MSDUs into the first MPDU based on the determined codeword length.

In some implementations, the encoding of the PSDU includes generating one or more cyclic redundancy check (CRC) sequences based on a plurality of payload bits associated with the PSDU, where the one or more CRC sequences is encoded with the plurality of payload bits to produce the one or more codewords. In some implementations, the method further includes grouping the one or more codewords into one or more codeword groups, where the one or more CRC sequences includes a respective CRC sequence for each of the one or more codeword groups.

Another innovative aspect of the subject matter described in this disclosure can be implemented in a method for wireless communication. The method may be performed by a wireless communication device, and may include receiving, from a transmitting device, a physical-layer protocol data unit (PPDU) including one or more codewords; decoding the received codewords to recover a payload of the PPDU, where the decoded codewords include one or more CRC sequences; and validating the decoded codewords, in a physical (PHY) layer of the wireless communication device, based on the one or more CRC sequences. In some instances, the decoded codewords are grouped into one or more codeword groups, where each of the codeword groups is validated based on a respective CRC sequence of the one or more CRC sequences.

In some implementations, the validating of the decoded codewords includes determining, based on the CRC sequences, that one or more of the codewords or groups of codewords were not correctly decoded by the wireless communication device; and transmitting, to the transmitting device, a hybrid automatic repeat request (HARQ) feedback frame identifying the one or more codewords or groups of codewords that were not correctly decoded. In some instances, the one or more codewords or groups of codewords include valid low-density parity-check (LDPC) codewords.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including determining a codeword length to be used for encoding a PSDU; determining a size of a first A-MPDU subframe to be included in the PSDU, where the first A-MPDU subframe includes a first MPDU; aligning the first A-MPDU subframe with one or more codewords of the PSDU, where the alignment of the first A-MPDU includes selectively adding one or more padding bits to the PSDU based on the determined codeword length and the size of the first A-MPDU subframe; and encoding the PSDU, including the first A-MPDU subframe, as one or more codewords having the determined codeword length.

Another innovative aspect of the subject matter described in this disclosure can be implemented in a wireless communication device. In some implementations, the wireless communication device may include at least one modem, at least one processor communicatively coupled with the at least one modem, and at least one memory communicatively coupled with the at least one processor and storing processor-readable code. In some implementations, execution of the processor-readable code by the at least one processor causes the wireless communication device to perform operations including receiving, from a transmitting device, a PPDU including one or more codewords; decoding the received codewords to recover a payload of the PPDU, where the decoded codewords include one or more CRC sequences; and validating the decoded codewords, in a PHY layer of the wireless communication device, based on the one or more CRC sequences. In some instances, the one or more codewords or groups of codewords include valid LDPC codewords

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 3A shows an example physical layer (PHY) preamble usable for communications between an AP and each of a number of STAs.

FIG. 3B shows another example PHY preamble usable for communications between an AP and each of a number of stations.

FIG. 8D shows a flowchart illustrating an example process for wireless communication that supports MPDU and codeword alignment and validation according to some implementations.

FIG. 9A shows a flowchart illustrating an example process for wireless communication that supports MPDU and codeword alignment and validation according to some other implementations.

FIG. 9B shows a flowchart illustrating an example process for wireless communication that supports MPDU and codeword alignment and validation according to some other implementations.

FIG. 13A shows an example MAC padding configuration according to some other implementations.

FIG. 15A shows an example pre-forward error correction (pre-FEC) cyclic redundancy check (CRC) configuration according to some implementations.

Like reference numbers and designations in the various drawings indicate like elements.

DETAILED DESCRIPTION

Figure 1:
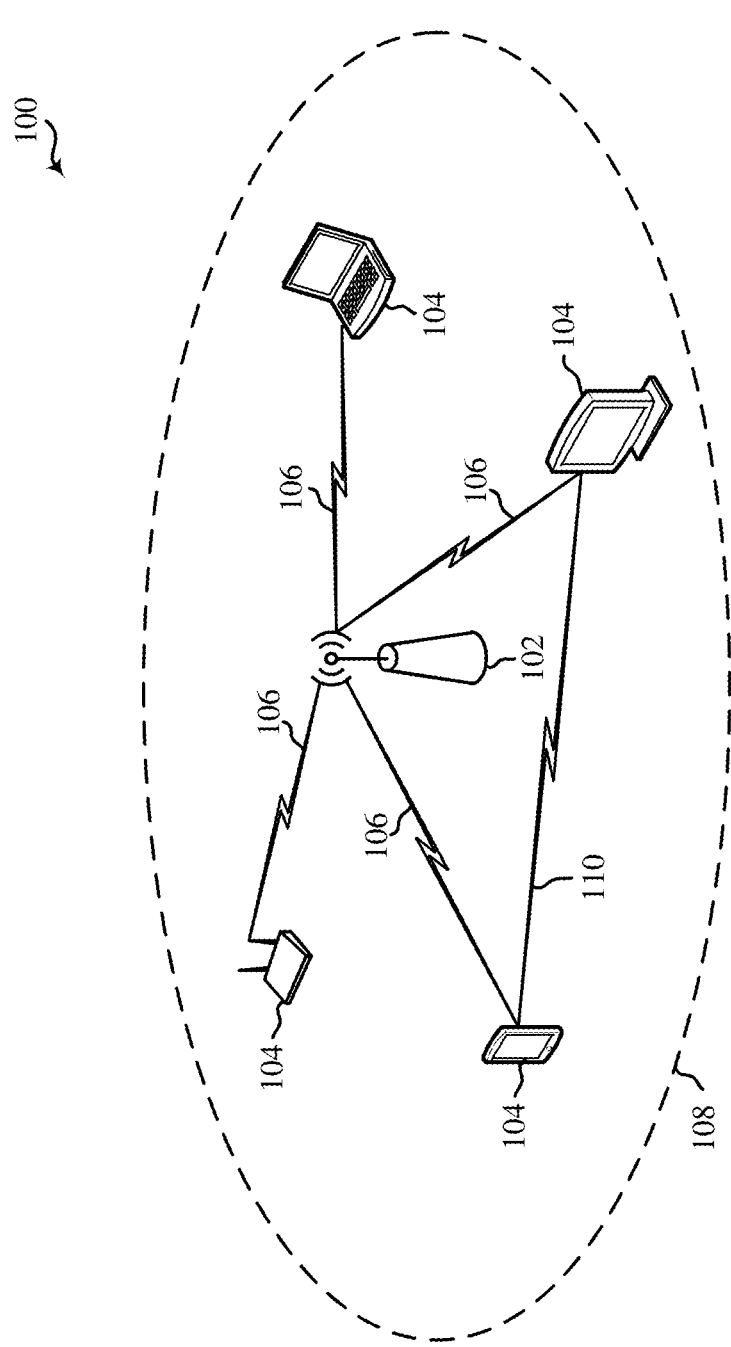
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to retransmitting data that was received in error (such as incorrectly decoded or not received at all) by a receiving device. Some implementations more specifically relate to using hybrid automatic repeat request (HARQ) techniques for retransmitting portions of data that were not correctly decoded (or not received) by one or more wireless devices compatible with the IEEE 802.11 family of standards. A receiving device that does not correctly decode a portion of a first data unit received from a transmitting device may transmit a HARQ feedback frame indicating the portion of the first data unit that was not correctly decoded. The first data unit may include a number of codewords representing a number of aggregate medium access control (MAC) protocol data unit (A-MPDU) subframes associated with a physical-layer service data unit (PSDU). The first data unit may be transmitted as one or more low-density parity check (LDPC) codewords. In some aspects, the transmitting device may retransmit a subset of the codewords corresponding to the indicated portion of the first data unit.

In some implementations, aggregate MPDU (A-MPDU) subframes containing an MPDU may be aligned with codeword boundaries in a PSDU. The alignment of the A-MPDU subframes may be performed by selectively adding one or more padding bits to the PSDU based, at least in part, on the size of each A-MPDU subframe and the lengths of the LDPC codewords. In instances where the size of a first A-MPDU subframe is less than the codeword length, the first A-MPDU subframe may be aligned with a first codeword of the PSDU so that the first A-MPDU subframe is encoded exclusively within the first codeword. In some implementations, a second A-MPDU subframe may be further aligned with a second codeword of the PSDU so that the first and second A-MPDU subframes are encoded in different codewords. In instances where the size of a first A-MPDU subframe is greater than the codeword length, the first A-MPDU subframe may be aligned with two or more contiguous codewords of the PSDU so that the two or more contiguous codewords include the first A-MPDU subframe and no portions of any other A-MPDU subframe. In some aspects, the alignment may be performed by inserting the padding bits between two or more A-MPDU subframes associated with the PSDU. The padding bits may correspond to a number of MPDU delimiters or a known bit sequence.

In some implementations, smaller MAC service data units (MSDUs) that would otherwise be included in different MPDUs may instead be aggregated (as an A-MSDU) into a larger MPDU, which in turn is contained in an A-MPDU subframe, for codeword alignment purposes. For example, the A-MPDU subframe may be aligned with a first codeword of the PSDU so that each of the aggregated MSDUs, contained in the MPDU, is encoded exclusively within the first codeword. In some other implementations, larger MSDUs, A-MSDUs, or MAC management protocol data units (MMPDUs) may be subdivided into a plurality of smaller fragments for codeword alignment purposes. For example, a fragment that is smaller than the codeword length may be aligned with a first codeword of the PSDU so that the fragment is encoded exclusively within the first codeword. If a fragment is larger than the codeword length, the fragment may be aligned with two or more contiguous codewords of the PSDU so that the two or more contiguous codewords include the fragment and no portions of any other fragment.

In some other implementations, a pre-forward error correction (pre-FEC) cyclic redundancy check (CRC) may be used to validate one or more LDPC codewords or groups of codewords. For example, prior to LDPC encoding, a CRC sequence may be inserted into each set of payload bits (or information bits) to be encoded as an LDPC codeword or group of codewords. Upon decoding the codewords in a received PPDU, a wireless communication device may then validate one or more of the codewords based at least in part the CRC sequences included in the PPDU. The wireless communication device may determine, based on the CRC sequences, whether one or more of the codewords were decoded to an incorrect (but valid) LDPC codeword. For example, a codeword may pass the LDPC parity check, but the payload information (such as the MPDU) encoded therein may still be incorrect. For any codewords or groups of codewords that failed CRC validation, the wireless communication device may transmit, to the transmitting device, a HARQ feedback frame requesting that the codewords or groups of codewords be retransmitted.

Particular implementations of the subject matter described in this disclosure can be implemented to realize one or more of the following potential advantages. By aligning A-MPDU subframes with codeword boundaries in a PSDU, aspects of the present disclosure may provide a finer granularity of HARQ feedback control. Among other advantages, the A-MPDU alignment may reduce the amount of resources needed to store or process a HARQ sequence. For example, in instances where one or more LDPC codewords are decoded as the wrong (yet valid) codewords, a MAC-layer frame check sequence (FCS) may be used to further validate the MPDU represented by the one or more codewords. Because the MPDU is exclusively encoded in the one or more codewords, the FCS validation provides a fine granularity of redundancy for validating the one or more codewords. Moreover, none of the remaining codewords need to be retransmitted as a result of a failed FCS validation for a single MPDU. Further, by inserting CRC sequences into LDPC codewords or groups of codewords, aspects of the present disclosure also may provide a finer granularity of redundancy for validating codewords even when there is not alignment between the MPDUs and codeword boundaries.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many B14 within range of the STA or to select among multiple APs 102 that together form an extended service set (ESS) including multiple connected B14. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
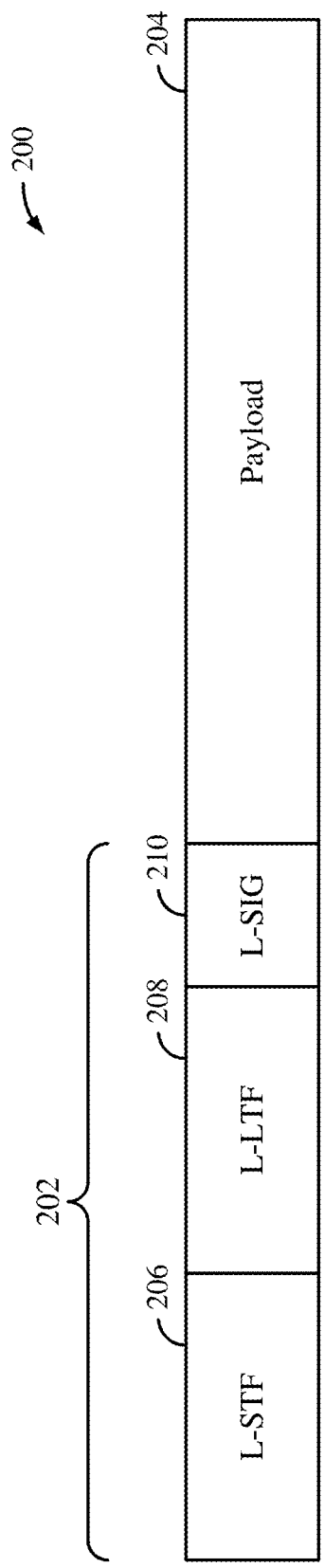
FIG. 2A shows an example protocol data unit (PDU) usable for communications between an access point (AP) and a number of stations (STAs)

FIG. 2A shows an example protocol data unit (PDU) 200 usable for communications between an AP and a number of STAs. For example, the PDU 200 can be configured as a PPDU. As shown, the PDU 200 includes a PHY preamble 202 and a PHY payload 204. For example, the PHY preamble 202 may include a legacy portion that itself includes a legacy short training field (L-STF) 206, a legacy long training field (L-LTF) 208, and a legacy signaling field (L-SIG) 210. The PHY preamble 202 may also include a non-legacy portion (not shown). The L-STF 206 generally enables a receiving device to perform automatic gain control (AGC) and coarse timing and frequency estimation. The L-LTF 208 generally enables a receiving device to perform fine timing and frequency estimation and also to estimate the wireless channel. The L-SIG 210 generally enables a receiving device to determine a duration of the PDU and use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may generally carry higher layer data, for example, in the form of medium access control (MAC) protocol data units (MPDUs) or aggregated MPDUs (A-MPDUs).

Figure 2B:
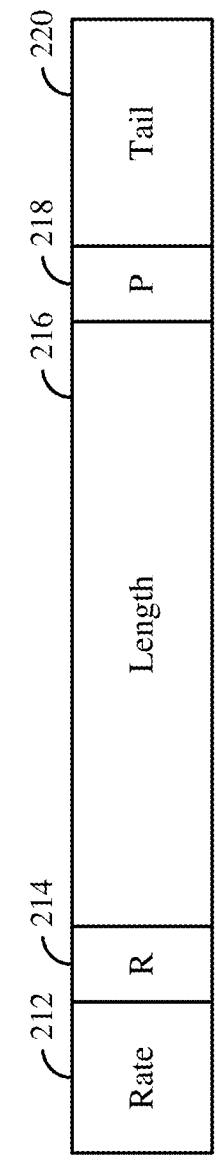
FIG. 2B shows an example field in the PDU of FIG. 2A.

FIG. 2B shows an example L-SIG field 210 in the PDU of FIG. 2A. The L-SIG 210 includes a data rate field 212, a reserved bit 214, a length field 216, a parity bit 218, and a tail field 220. The data rate field 212 indicates a data rate (note that the data rate indicated in the data rate field 212 may not be the actual data rate of the data carried in the payload 204). The length field 216 indicates a length of the packet in units of, for example, bytes. The parity bit 218 is used to detect bit errors. The tail field 220 includes tail bits that are used by the receiving device to terminate operation of a decoder (for example, a Viterbi decoder). The receiving device utilizes the data rate and the length indicated in the data rate field 212 and the length field 216 to determine a duration of the packet in units of, for example, microseconds (µs).

FIG. 3A shows an example PHY preamble 300 usable for communications between an AP 102 and each of a number of STAs 104. The preamble 300 includes a legacy portion 302 and a non-legacy portion 304. The legacy portion 302 includes an L-STF 306, an L-LTF 308, and an L-SIG 310. The non-legacy preamble portion 304 is formatted as a Very High Throughput (VHT) preamble in accordance with the IEEE 802.11ac amendment to the IEEE 802.11 standard. The non-legacy preamble portion 304 includes a first VHT signaling field (VHT-SIG-A) 312, a VHT short training field (VHT-STF) 314, one or more VHT long training fields (VHT-LTFs) 316 and a second VHT signaling field (VHT-SIG-B) 318 encoded separately from the VHT-SIG-A field 312. Like the L-STF 306, L-LTF 308, and L-SIG 310, the information in the VHT-SIG-A field 312 may be duplicated and transmitted in each of the component 20 MHz channels in instances involving the use of a bonded channel.

The VHT-STF 214 is used to improve automatic gain control estimation in a MIMO transmission. The VHT-LTFs 216 are used for MIMO channel estimation and pilot subcarrier tracking. The preamble 200 includes one VHT-LTF 216 for each spatial stream the preamble is transmitted on. The VHT-SIG-A field 212 may indicate to VHT-compatible APs 102 and STAs 104 that the PPDU is a VHT PPDU. The VHT-SIG-A field 212 includes signaling information and other information usable by STAs 104 to decode the VHT-SIG-B field 218. The VHT-SIG-A field 212 may indicate a bandwidth (BW) of the packet, the presence of space-time block coding (STBC), the number $N_{STS}$ of space-time streams per user, a Group ID indicating the group and user position assigned to a STA, a partial association identifier that may combine the AID and the BSSID, a short guard interval (GI) indication, a single-user/multi-user (SU/MU) coding indicating whether convolutional or LDPC coding is used, a modulation and coding scheme (MCS), an indication of whether a beamforming matrix has been applied to the transmission, a cyclic redundancy check (CRC) and a tail.

The VHT-SIG-B field 218 is used for MU transmissions and contains the actual data rate and MPDU or A-MPDU length values for each of the multiple STAs 104, as well as signaling information usable by the STAs 104 to decode data received in the payload portion of the PPDU, including, for example, an MCS and beamforming information.

FIG. 3B shows another example PHY preamble 320 usable for communications between an AP 102 and each of a number of stations 104. The preamble 320 may be used for MU-OFDMA or MU-MIMO transmissions. The preamble 320 includes a legacy portion 322 and a non-legacy portion 324. The legacy portion 322 includes an L-STF 326, an L-LTF 328, and an L-SIG 330. The non-legacy preamble portion 304 is formatted as a High Efficiency (HE) WLAN preamble in accordance with the IEEE 802.11ax amendment to the IEEE 802.11 standard. The non-legacy preamble portion 324 includes a repeated legacy signaling field (RL-SIG) 332, a first HE signaling field (HE-SIG-A) 334, a second HE signaling field (HE-SIG-B) 336 encoded separately from the HE-SIG-A field 334, an HE short training field (HE-STF) 338 and HE long training fields (HE-LTFs) 340. Like the L-STF 326, L-LTF 328, and L-SIG 330, the information in the RL-SIG field 332 and the HE-SIG-A field 334 may be duplicated and transmitted in each of the component 20 MHz channels in instances involving the use of a bonded channel.

The RL-SIG field 332 may indicate to an HE-compatible STA 104 that the PPDU is an HE PPDU. An AP 102 may use the HE-SIG-A field 334 to indicate to multiple identified STAs 104 that the AP has scheduled UL or DL resources. The HE-SIG-A field 334 may be decoded by each HE-compatible STA 104 served by the AP 102. The HE-SIG-A field 334 includes information usable by the identified STAs 104 to decode associated HE-SIG-B fields 336. For example, the HE-SIG-A field 334 may indicate the frame format, including locations and lengths of HE-SIG-B fields 336, available channel bandwidths, modulation and coding schemes (MCS), among other possibilities. The HE-SIG-A field 334 also may include HE WLAN signaling information usable by STAs 104 other than the number of identified STAs 104.

The HE-SIG-B fields 336 carry STA-specific scheduling information such as, for example, per-user MCS values and per-user RU allocation information. In the context of DL MU-OFDMA, such information enables the respective STAs 104 to identify and decode corresponding RUs in the associated data field. Each HE-SIG-B field 336 includes a common field and at least one STA-specific ("user-specific") field. The common field can indicate RU distributions to multiple STAs 104, indicate the RU assignments in the frequency domain, indicate which RUs are allocated for MU-MIMO transmissions and which RUs correspond to MU-OFDMA transmissions, the number of users in allocations, among other possibilities. The common field may be encoded with common bits, cyclic redundancy check (CRC) bits, and tail bits. The user-specific fields are assigned to particular STAs 104 and used to schedule specific RUs and to indicate the scheduling to other WLAN devices. Each user-specific field may include multiple user block fields (which may be followed by padding). Each user block field may include two user fields that contain information for two STAs to decode their respective RU payloads.

Figure 4:
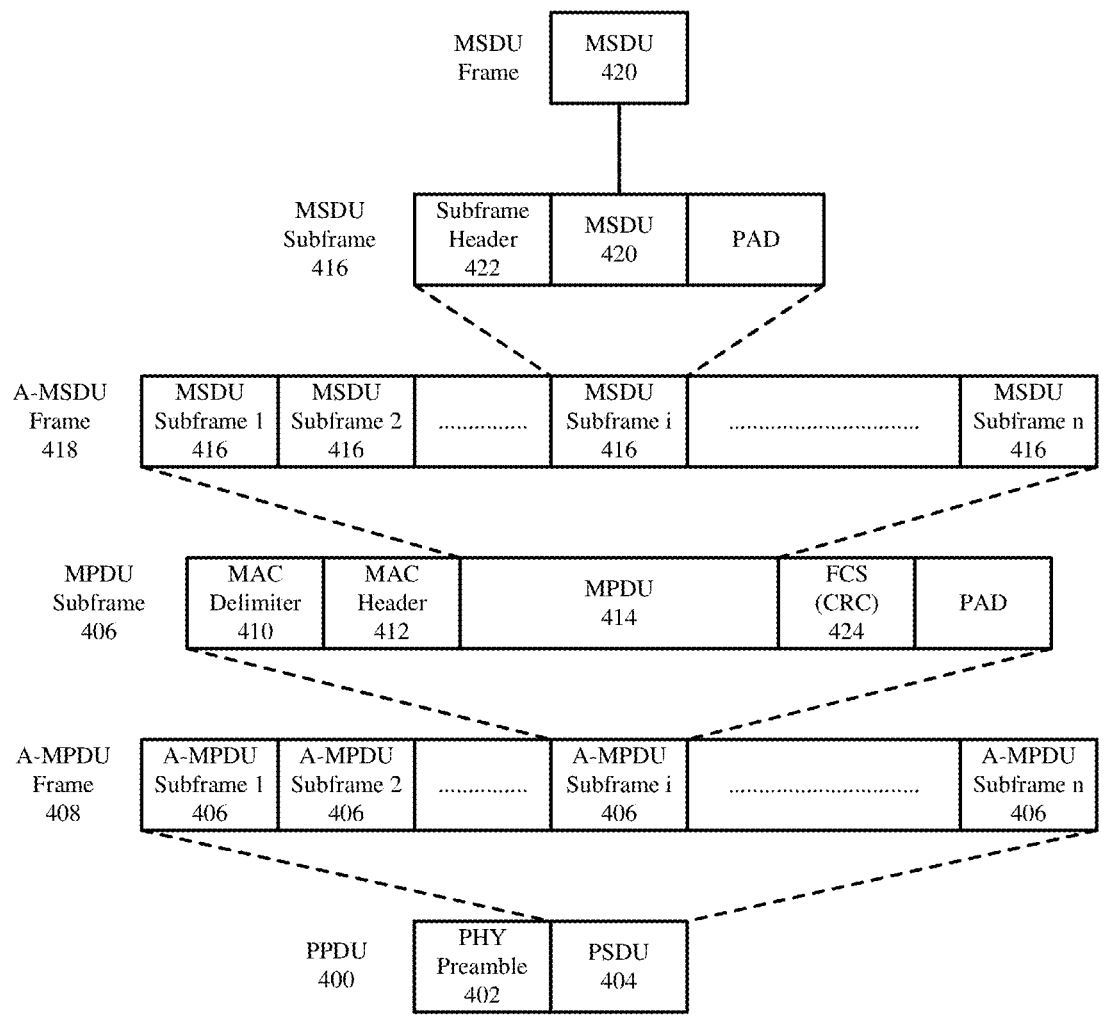
FIG. 4 shows an example physical layer convergence protocol (PLCP) protocol data unit (PPDU) usable for communications between an AP and a number of STAs.

FIG. 4 shows an example PPDU 400 usable for communications between an AP 102 and a number of STAs 104. As described above, each PPDU 400 includes a PHY preamble 402 and a PSDU 404. Each PSDU 404 may carry one or more MAC protocol data units (MPDUs). For example, each PSDU 404 may carry an aggregated MPDU (A-MPDU) 408 that includes an aggregation of multiple A-MPDU subframes 406. Each A-MPDU subframe 406 may include a MAC delimiter 410 and a MAC header 412 prior to the accompanying MPDU 414, which comprises the data portion ("payload" or "frame body") of the A-MPDU subframe 406. The MPDU 414 may carry one or more MAC service data unit (MSDU) subframes 416. For example, the MPDU 414 may carry an aggregated MSDU (A-MSDU) 418 including multiple MSDU subframes 416. Each MSDU subframe 416 contains a corresponding MSDU 420 preceded by a subframe header 422.

Referring back to the A-MPDU subframe 406, the MAC header 412 may include a number of fields containing information that defines or indicates characteristics or attributes of data encapsulated within the frame body 414. The MAC header 412 also includes a number of fields indicating addresses for the data encapsulated within the frame body 414. For example, the MAC header 412 may include a combination of a source address, a transmitter address, a receiver address or a destination address. The MAC header 412 may include a frame control field containing control information. The frame control field specifies the frame type, for example, a data frame, a control frame, or a management frame. The MAC header 412 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each A-MPDU subframe 406 may also include a frame check sequence (FCS) field 424 for error detection. For example, the FCS field 416 may include a cyclic redundancy check (CRC).

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including a number of different frequency subcarriers ("tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Figure 5:
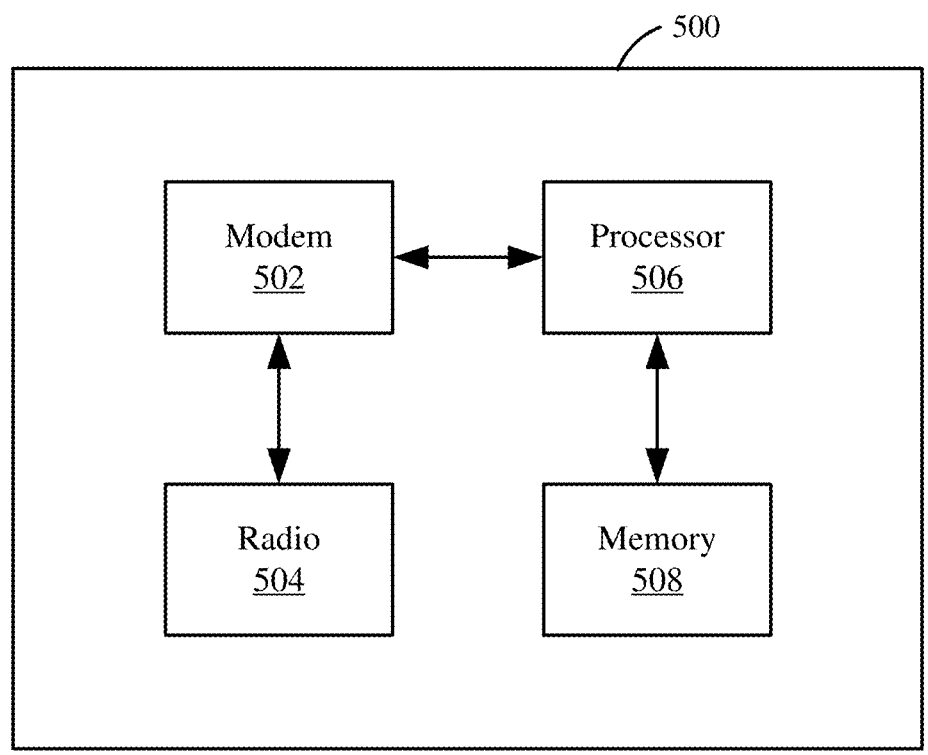
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more radios 504 (collectively "the radio 504"). In some implementations, the wireless communication device 506 further includes one or more processors, processing blocks or processing elements 506 (collectively "the processor 506") and one or more memory blocks or elements 508 (collectively "the memory 508").

The modem 502 can include an intelligent hardware block or device such as, for example, an application-specific integrated circuit (ASIC) among other possibilities. The modem 502 is generally configured to implement a PHY layer. For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC), a coder, a decoder, a multiplexer and a demultiplexer. For example, while in a transmission mode, data obtained from the processor 506 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, digital signals received from the radio 504 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 506) for processing, evaluation or interpretation.

The radio 504 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 506 may generally control the modem 502 to cause the modem to perform various operations described above.

The memory 504 can include tangible storage media such as random-access memory (RAM) or read-only memory (ROM), or combinations thereof. The memory 504 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
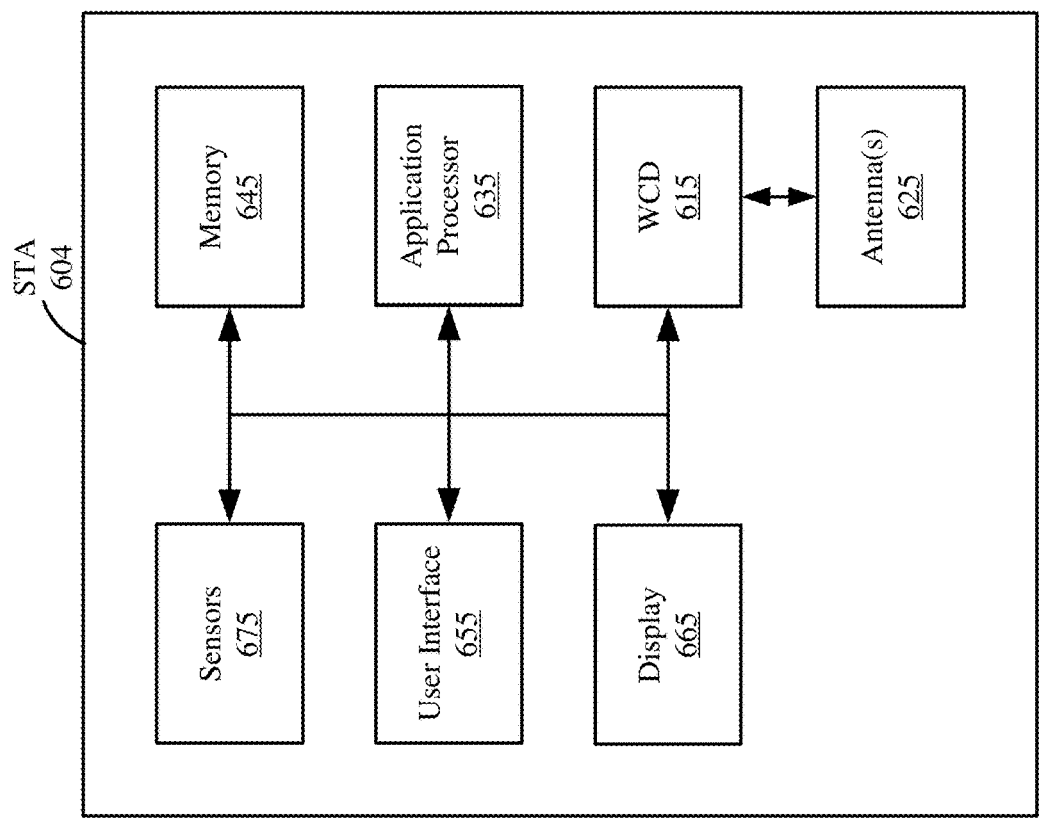
FIG. 6B shows a block diagram of an example station (STA).
Figure 6A:
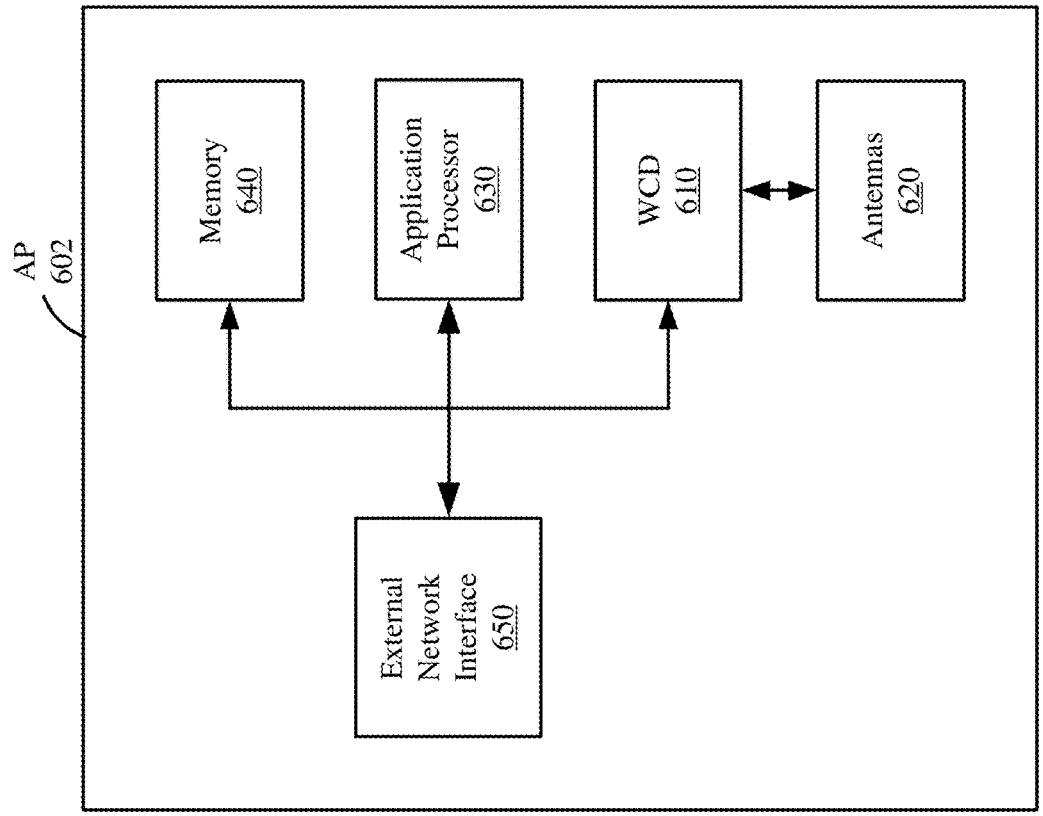
FIG. 6A shows a block diagram of an example access point (AP).

FIG. 6A shows a block diagram of an example AP 602. For example, the AP 602 can be an example implementation of the AP 102 described with reference to FIG. 1. The AP 602 includes a wireless communication device (WCD) 610. For example, the wireless communication device 610 may be an example implementation of the wireless communication device 500 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615. For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

Figure 7A:
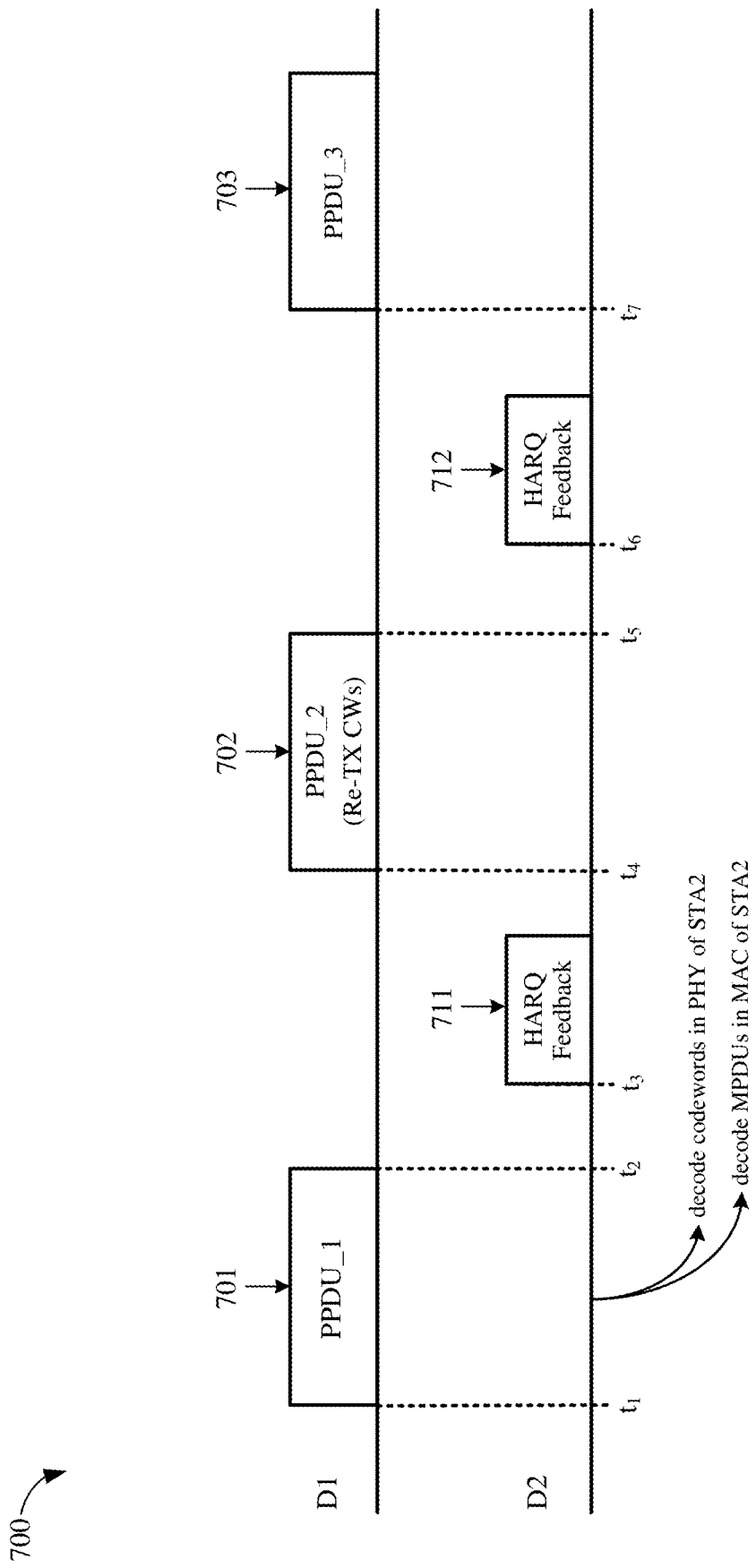
FIG. 7A shows a timing diagram illustrating the transmissions of communications according to some implementations.

FIG. 7A shows a timing diagram 700 illustrating the transmissions of communications according to some implementations. In the example of FIG. 7A, the communications may be exchanged between a first wireless communication device (D1) and a second wireless communication device (D2). Each of the devices D1 and D2 may be any suitable wireless communication device such as one of the STAs 104 and 604 described above with reference to FIGS. 1 and 6B, respectively, or one of the APs 102 and 602 described above with reference to FIGS. 1 and 6A, respectively. In the timing diagram 700, the first device D1 may be the transmitting device, and the second device D2 may be the receiving device.

At time $t_1$, the first device D1 transmits a first packet 701 including a first PPDU (PPDU_1) to the second device D2. The first PPDU may include a number of first MPDUs (for example, in the form of a first A-MPDU) each containing one or more data frames (such as MSDUs or MAC frames). The first MPDUs may be encoded using an LDPC encoding technique and transmitted to the second device D2 as a number of first LDPC codewords representing the number of first MPDUs. In some implementations, the first packet 701 is transmitted to the second device D2 using SU-MIMO, MU-MIMO, or OFDMA communication techniques.

Between times $t_1$ and $t_2$, the second device D2 receives the first packet 707 including at least a portion of the first PPDU. In some implementations, a physical-layer (PHY) of the second device D2 may decode the number of first LDPC codewords contained in the first PPDU, and a MAC layer of the second device D2 may decode the first MPDUs encoded in the first LDCP codewords. In the example of FIG. 7A, the second device D2 may not correctly decode at least a portion of the first PPDU.

At time $t_3$, the second device D2 transmits a first hybrid automatic repeat request (HARQ) feedback frame 711 to the first device D1. The first HARQ feedback frame 711 may indicate that one or more first codewords or groups of codewords of the first PPDU were not correctly decoded. In some implementations, the first HARQ feedback frame 711 may include a codeword-based bitmap identifying one or more codewords or groups of codewords of the first PPDU that were not correctly decoded by the second device D2. In addition, or in the alternative, the first HARQ feedback frame 711 may include an MPDU-based bitmap identifying a number of first MPDUs that were not correctly decoded by the second device D2.

The first device D1 receives the first HARQ feedback frame 711 and determines the one or more first codewords or groups of codewords of the first PPDU to be retransmitted. At time $t_4$, the first device D1 retransmits the indicated one or more first codewords or groups of codewords of the first PPDU to the second device D2. In some implementations, the retransmitted codewords or groups of codewords may be embedded within a second PPDU (PPDU_2) transmitted in a second packet 702 to the second device D2 using SU-MIMO, MU-MIMO or OFDMA communication techniques. The second PPDU also may include a number of second MPDUs (for example, in the form of a number of second A-MPDU subframes) each containing one or more data frames (such as MSDUs or MAC frames). The second MPDUs may be encoded and transmitted to the second device D2 as a number of second LDPC codewords representing the number of second MPDUs.

Between times $t_4$ and $t_5$, the second device D2 receives the second packet 702 including the second PPDU. In some implementations, the PHY of the second device D2 may decode the first codewords contained in the retransmission, and the MAC layer of the second device D2 may decode the first MPDUs encoded in the retransmission. In the example of FIG. 7A, the second device D2 may correctly decode each of the retransmitted first codewords and first MPDUs.

At time $t_6$, the second device D2 transmits a second HARQ feedback frame 712 to STA1. The second HARQ feedback frame 712 may indicate that all of the codewords or groups of codewords of the first PPDU were correctly decoded. The first device D1 receives the second HARQ feedback frame 712 and may transmit a third PPDU (PPDU_3), at time $t_7$, different than the first and the second PPDUs, to the second device D2 as a third packet 703. The third packet 703 may be transmitted using SU-MIMO, MU-MIMO or OFDMA communication techniques. In some implementations, the third PPDU may include a number of third MPDUs each containing one or more data frames (such as MSDUs or MAC frames). The third MPDUs may be encoded and transmitted to the second device D2 as a number of third LDPC codewords representing the number of third MPDUs.

Figure 7B:
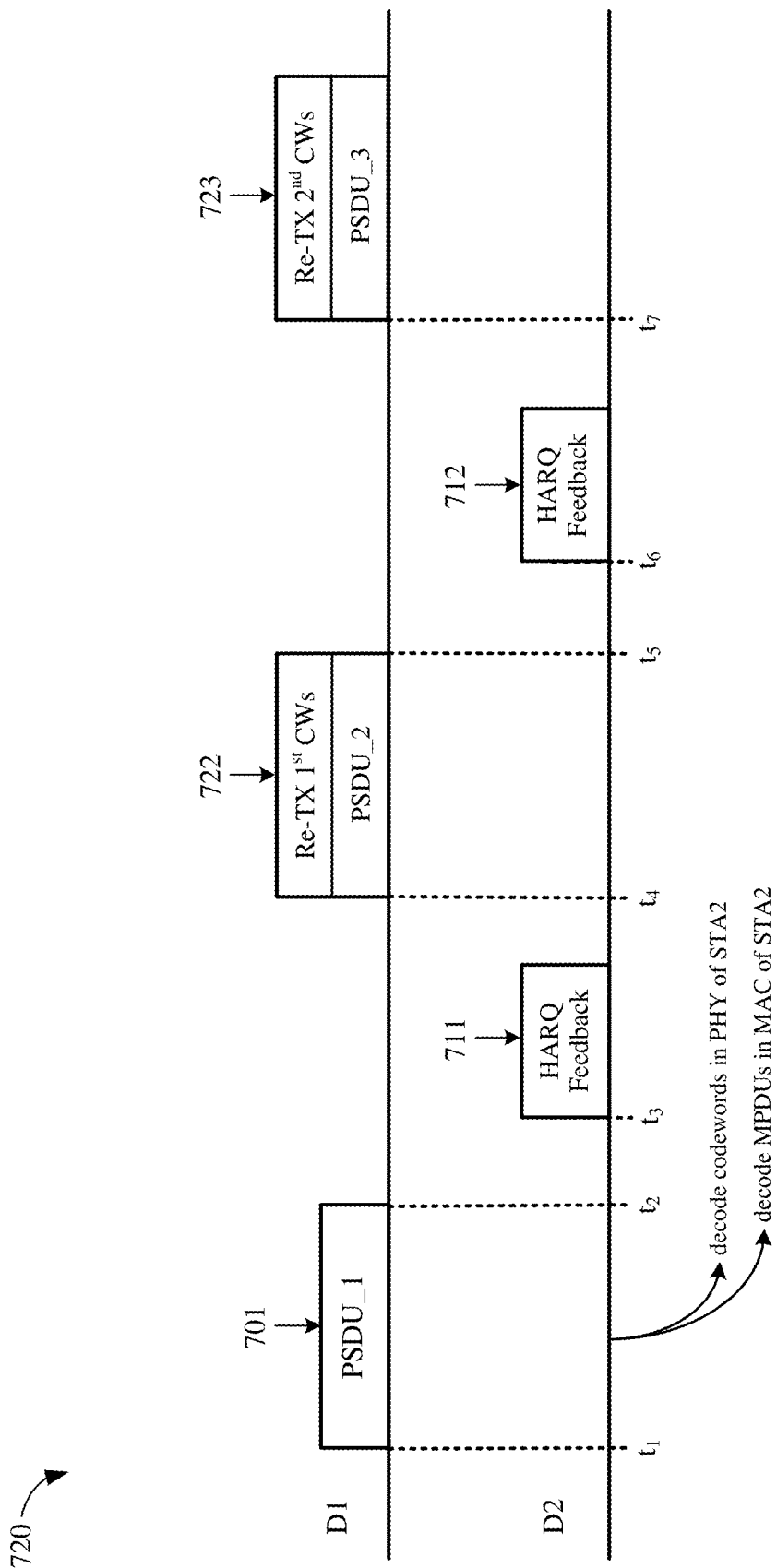
FIG. 7B shows a timing diagram illustrating the transmissions of communications according to some other implementations.

FIG. 7B shows a timing diagram 720 illustrating the transmissions of communications according to some other implementations. In the example of FIG. 7B, the communications may be exchanged between a first wireless communication device (D1) and a second wireless communication device (D2). Each of the devices D1 and D2 may be any suitable wireless communication device such as one of the STAs 104 and 604 described above with reference to FIGS. 1 and 6B, respectively, or one of the APs 102 and 602 described above with reference to FIGS. 1 and 6A, respectively. In the timing diagram 720, the first device D1 may be the transmitting device, and the second device D2 may be the receiving device.

In some implementations, the timing diagram 700B is similar to the timing diagram 700A of FIG. 7A, except that the transmitting device may transmit a second data unit to the receiving device concurrently with the retransmission of an indicated portion of a first data unit. For example, at time $t_4$, the first device D1 may transmit a second PSDU (PSDU_2), different than the first PSDU (PSDU_1), concurrently with the retransmitted first codewords or groups of codewords of the first PSDU to the second device D2 as a second packet 722. In some implementations, the second PSDU may include a number of second MPDUs each containing one or more data frames (such as MSDUs or MAC frames). The second MPDUs may be encoded and transmitted to the second device D2 as a number of second LDPC codewords representing the number of second MPDUs.

In some implementations, the first device D1 may retransmit the indicated one or more first codewords or groups of codewords of the first PSDU using a first RU, and may transmit the second PSDU using a second RU different than the first RU. In other implementations, the first device D1 may retransmit the indicated one or more first codewords or groups of codewords of the first PSDU using a first group of RUs, and may transmit the second PSDU using a second group of RUs. In some other implementations, the first device D1 may retransmit the indicated one or more first codewords or groups of codewords of the first PSDU using a first set of spatial streams, and may transmit the second PSDU using second set of spatial streams different than the first set of spatial streams.

Between times $t_4$ and $t_5$, the second device D2 receives the second packet 722 including the second PSDU and the retransmitted one or more first codewords or groups of codewords of the first PSDU. In some implementations, the PHY of the second device D2 may decode the number of second LDPC codewords contained in the second PSDU, and the MAC layer of the second device D2 may decode the second MPDUs encoded in the second PSDU. In the example of FIG. 7B, the second device D2 may not correctly decode at least a portion of the second PSDU.

At time $t_6$, the second device D2 transmits a second HARQ feedback frame 712 to STA1. The second HARQ feedback frame 712 may indicate that one or more second codewords or groups of codewords of the second PSDU were not correctly decoded. In some implementations, the second HARQ feedback frame 712 may include a codeword-based bitmap identifying one or more second codewords or groups of codewords of the second PSDU that were not correctly decoded by the second device D2. In addition, or in the alternative, the second HARQ feedback frame 712 may include an MPDU-based bitmap identifying a number of second MPDUs that were not correctly decoded by the second device D2.

The first device D1 receives the second HARQ feedback frame 712 and determines the one or more second codewords or groups of codewords of the second PSDU to be retransmitted. At time $t_7$, the first device D1 retransmits the indicated one or more second codewords or groups of codewords of the second PSDU to the second device D2. In some implementations, the first device D1 may transmit a third PSDU (PSDU_3), different than the first and second PSDUs, concurrently with the retransmitted second codewords or groups of codewords of the second PSDU, to the second device D2 as a third packet 723. The third packet 723 may be transmitted using SU-MIMO, MU-MIMO, or OFDMA communication techniques. In some implementations, the third PSDU may include a number of third MPDUs each containing one or more data frames (such as MSDUs or MAC frames). The third MPDUs may be encoded and transmitted to the second device D2 as a number of third LDPC codewords representing the number of third MPDUs.

As described above, retransmitting data that was not correctly decoded (or received) by a receiving device consumes resources of a shared wireless medium, which may reduce the throughput of a wireless network. Moreover, because channel conditions associated with data retransmission may be similar to channel conditions associated with the initial data transmission (such as a noisy channel, a busy channel, or a faded channel), multiple retransmissions of incorrectly decoded data may be necessary for the receiving device to correctly receive and decode all of the data associated with the initial transmission, which may consume limited resources of the shared wireless medium.

Various implementations relate generally to retransmitting data that was received in error (such as incorrectly decoded or not received at all) by a receiving device. More specifically, aspects of the present disclosure relate to reducing overhead for HARQ processes in wireless devices compatible with the IEEE 802.11 family of standards. Because LDPC codewords are generated in the PHY, whereas MPDUs are generated in the MAC layer, portions of an MPDU may extend across one or more codeword boundaries. As a result, a failed MPDU validation could require the retransmission of multiple LDPC codewords, some of which may include portions of other MPDUs that have already been successfully validated. Accordingly, some aspects of the present disclosure relate to reducing the size or frequency of retransmissions. Other aspects relate to reducing the amount of resources or overhead needed to support HARQ sequences. Still further, some other aspects relate to improving the accuracy or granularity of codeword validation.

In some implementations, A-MPDU subframes containing an MPDU may be aligned with codeword boundaries in a PSDU. The alignment of the A-MPDU subframes may be performed by selectively adding one or more padding bits to the PSDU based, at least in part, on the size of each A-MPDU subframe and the length of the LDPC codewords. In instances where the size of a first A-MPDU subframe is less than the codeword length, the first A-MPDU subframe may be aligned with a first codeword of the PSDU so that the first A-MPDU subframe is encoded exclusively within the first codeword. In some implementations, a second A-MPDU subframe may be further aligned with a second codeword of the PSDU so that the first and second A-MPDU subframes are encoded in different codewords. In instances where the size of a first A-MPDU subframe is greater than the codeword length, the first A-MPDU subframe may be aligned with two or more contiguous codewords of the PSDU so that the two or more contiguous codewords include the first A-MPDU subframe and no portions of any other A-MPDU subframe. In some aspects, the alignment may be performed by inserting the padding bits between A-MPDU subframes associated with the PSDU. The padding bits may correspond to a number of MPDU delimiters or a known bit sequence.

In some implementations, smaller MSDUs that would otherwise be included in different MPDUs may instead be aggregated (as an A-MSDU) into a larger MPDU, which in turn is contained in an A-MPDU subframe, for codeword alignment purposes. For example, the A-MPDU subframe may be aligned with a first codeword of the PSDU so that each of the aggregated MSDUs, contained in the MPDU, is encoded exclusively within the first codeword. In some other implementations, larger MSDUs, A-MSDUs, or MMPDUs may be subdivided into a plurality of smaller fragments for codeword alignment purposes. For example, a fragment that is smaller than the codeword length may be aligned with a first codeword of the PSDU so that the fragment is encoded exclusively within the first codeword. If a fragment is larger than the codeword length, the fragment may be aligned with two or more contiguous codewords of the PSDU so that the two or more contiguous codewords include the fragment and no portions of any other fragment.

In some other implementations, a pre-forward error correction (pre-FEC) cyclic redundancy check (CRC) may be used to validate one or more LDPC codewords or groups of codewords. For example, prior to LDPC encoding, a CRC sequence may be inserted into each set of payload bits (or information bits) to be encoded as an LDPC codeword or group of codewords. Upon decoding the codewords in a received PPDU, a wireless communication device may then validate one or more of the codewords based at least in part the CRC sequences included in the PPDU. The wireless communication device may determine, based on the CRC sequences, whether one or more of the codewords were decoded to an incorrect (but valid) LDPC codeword. For example, a codeword may pass the LDPC parity check, but the payload information (such as the MPDU) encoded therein may still be incorrect. For any codewords or groups of codewords that failed CRC validation, the wireless communication device may transmit, to the transmitting device, a HARQ feedback frame requesting that the codewords or groups of codewords be retransmitted.

Particular implementations of the subject matter described in this disclosure can be implemented to realize one or more of the following potential advantages. By aligning A-MPDU subframes with codeword boundaries in a PSDU, aspects of the present disclosure may provide a finer granularity of HARQ feedback control. Among other advantages, the A-MPDU alignment may reduce the amount of resources needed to store or process a HARQ sequence. For example, in instances where one or more LDPC codewords are decoded as the wrong (yet valid) codewords, a MAC-layer FCS may be used to further validate the MPDU represented by the one or more codewords. Because the MPDU is exclusively encoded in the one or more codewords, the FCS validation provides a fine granularity of redundancy for validating the one or more codewords. Moreover, none of the remaining codewords need to be retransmitted as a result of a failed FCS validation for a single MPDU. Further, by inserting CRC sequences into LDPC codewords or groups of codewords, aspects of the present disclosure also may provide a finer granularity of redundancy for validating codewords even when there is not alignment between the MPDUs and codeword boundaries.

Figure 8A:
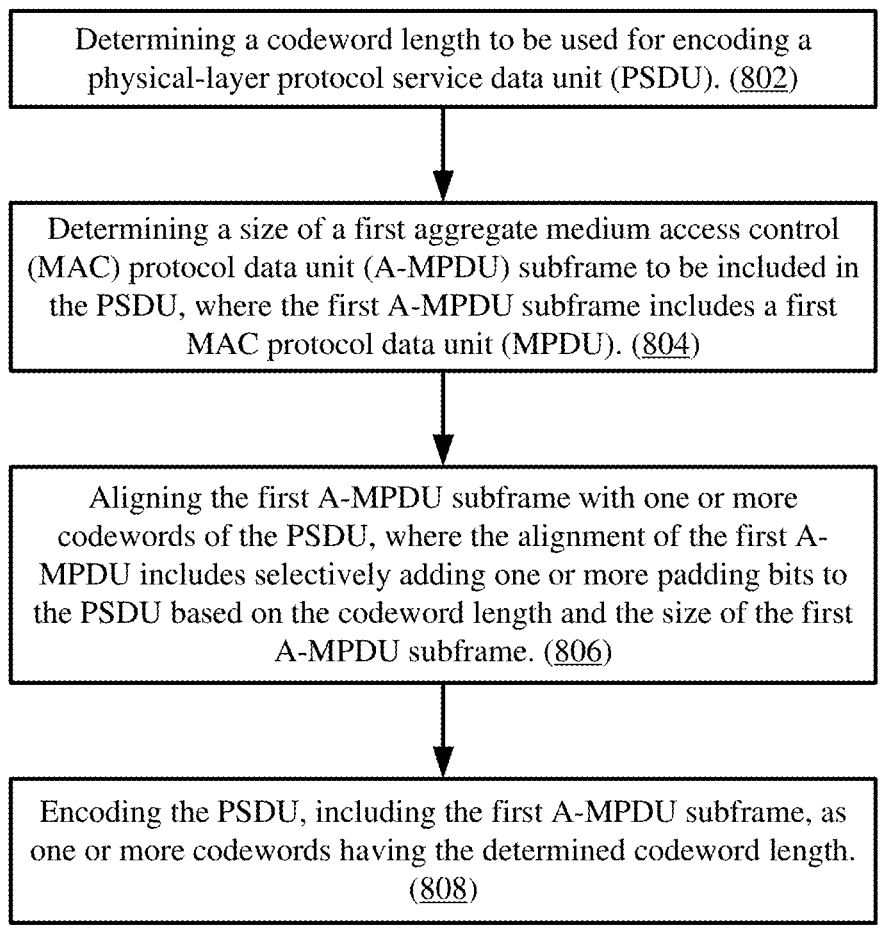
FIG. 8A shows a flowchart illustrating an example process for wireless communication that supports medium access control (MAC) protocol data unit (MPDU) and codeword alignment and validation according to some implementations.

FIG. 8A shows a flowchart illustrating an example process 800 for wireless communication that supports MPDU and codeword alignment and validation according to some implementations. The process 800 may be performed by a wireless communication device such as the wireless communication device 500 described above with reference to FIG. 5. In some implementations, the process 800 may be performed by a wireless communication device operating as or within a STA, such as one of the STAs 104 and 604 described above with reference to FIGS. 1 and 6B, respectively. In other implementations, the process 800 may be performed by a wireless communication device operating as or within an AP, such as one of the APs 102 and 602 described above with reference to FIGS. 1 and 6A, respectively.

In some implementations, the process 800 begins in block 802 with determining a codeword length to be used for encoding a physical-layer protocol service data unit (PSDU). In block 804, the process 800 proceeds with determining a size of a first aggregate medium access control (MAC) protocol data unit (A-MPDU) subframe to be included in the PSDU, where the first A-MPDU subframe includes a first MAC protocol data unit (MPDU). In block 806, the process 800 proceeds with aligning the first A-MPDU subframe with one or more codewords of the PSDU, where the alignment of the first A-MPDU includes selectively adding one or more padding bits to the PSDU based on the codeword length and the size of the first A-MPDU subframe. In some implementations, the first A-MPDU subframe may be aligned with codeword boundaries in the PSDU such that portions of the first A-MPDU subframe are not encapsulated within the same LDPC codeword as portions of another A-MPDU subframe in the PSDU. In block 808, the process 800 proceeds with encoding the PSDU, including the first A-MPDU subframe, as one or more codewords of the determined codeword length.

In some implementations, the PSDU may be transmitted to a receiving device and a hybrid automatic repeat request (HARQ) feedback frame may be further received from the receiving device. The HARQ feedback frame may indicate one or more codewords or groups of codewords of the PSDU were not correctly decoded by the receiving device. In other words, the receiving device may only require additional information regarding the one or more codewords or groups of codewords that were not correctly decoded. Thus, only the information in the transmitted PSDU regarding the one or more codewords or groups of codewords that were not correctly decoded may be retransmitted to the receiving device (although these retransmitted codewords may be included within a new PPDU that also includes codewords for another A-MPDU subframe).

Figure 8B:
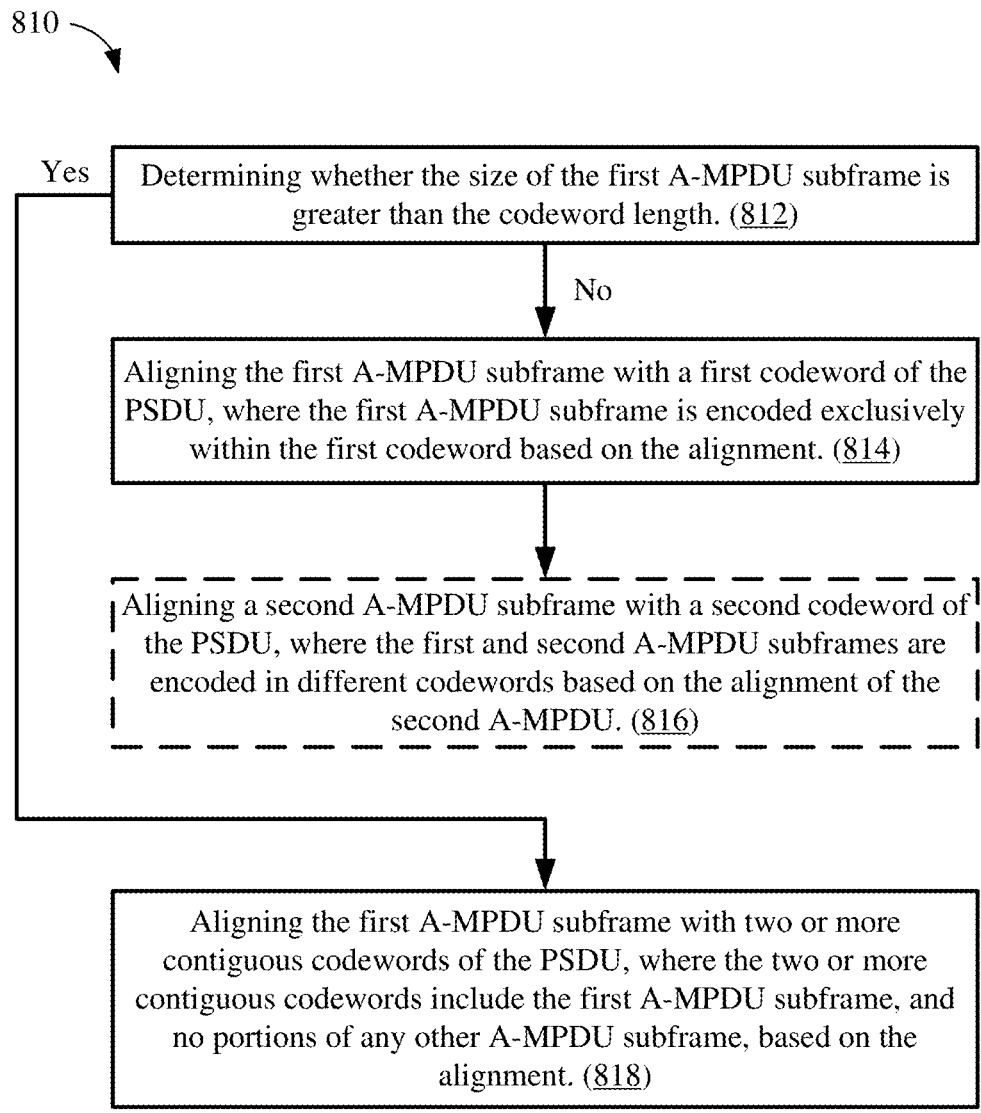
FIG. 8B shows a flowchart illustrating an example process for wireless communication that supports MPDU and codeword alignment and validation according to some implementations.

FIG. 8B shows a flowchart illustrating an example process 810 for wireless communication that supports MPDU and codeword alignment and validation according to some implementations. The process 810 may be performed by a wireless communication device such as the wireless communication device 500 described above with reference to FIG. 5. In some implementations, the process 810 may be performed by a wireless communication device operating as or within a STA, such as one of the STAs 104 and 604 described above with reference to FIGS. 1 and 6B, respectively. In other implementations, the process 810 may be performed by a wireless communication device operating as or within an AP, such as one of the APs 102 and 602 described above with reference to FIGS. 1 and 6A, respectively.

With reference to FIG. 8A, the process 810 may be a more detailed implementation of the A-MPDU and codeword alignment operation described in block 806 of the process 800. For example, the process 810 may begin, in block 812, after the determination of the codeword length in block 802 and the determination of the A-MPDU subframe size in block 804 of the process 800.

In block 812, the process 810 begins by determining whether the size of the first A-MPDU subframe is greater than the codeword length. If the size of the first A-MPDU subframe is not greater than the codeword length, the process 810 proceeds to block 814 with aligning the first A-MPDU subframe with a first codeword of the PSDU, where the first A-MPDU subframe is encoded exclusively within the first codeword based on the alignment. In some implementations, the process 810 may further proceed to block 816 with aligning a second A-MPDU subframe with a second codeword of the PSDU, where the first and second A-MPDU subframes are encoded in different codewords based on the alignment of the second A-MPDU. Conversely, if the size of the first A-MPDU subframe is determined to be greater than the codeword length in block 812, the process 810 proceeds to block 818 with aligning the first A-MPDU subframe with two or more contiguous codewords of the PSDU, where the two or more contiguous codewords include the first A-MPDU subframe, and no portions of any other A-MPDU subframe, based on the alignment.

In some implementations, the first A-MPDU subframe may be aligned with one or more codewords in the PSDU by padding the end of the first A-MPDU subframe or another A-MPDU subframe associated with the PSDU. More specifically, the padding may determine the bit position of the first A-MPDU subframe within the PSDU. In some aspects, the padding may include a predefined bit sequence. In some other aspects, the padding may include one or more MPDU delimiters. In some examples, at least one of the MPDU delimiters may have a length field value of zero. In another example, one or more of the MPDU delimiters may have a length field value greater than zero but less than four.

Figure 8C:
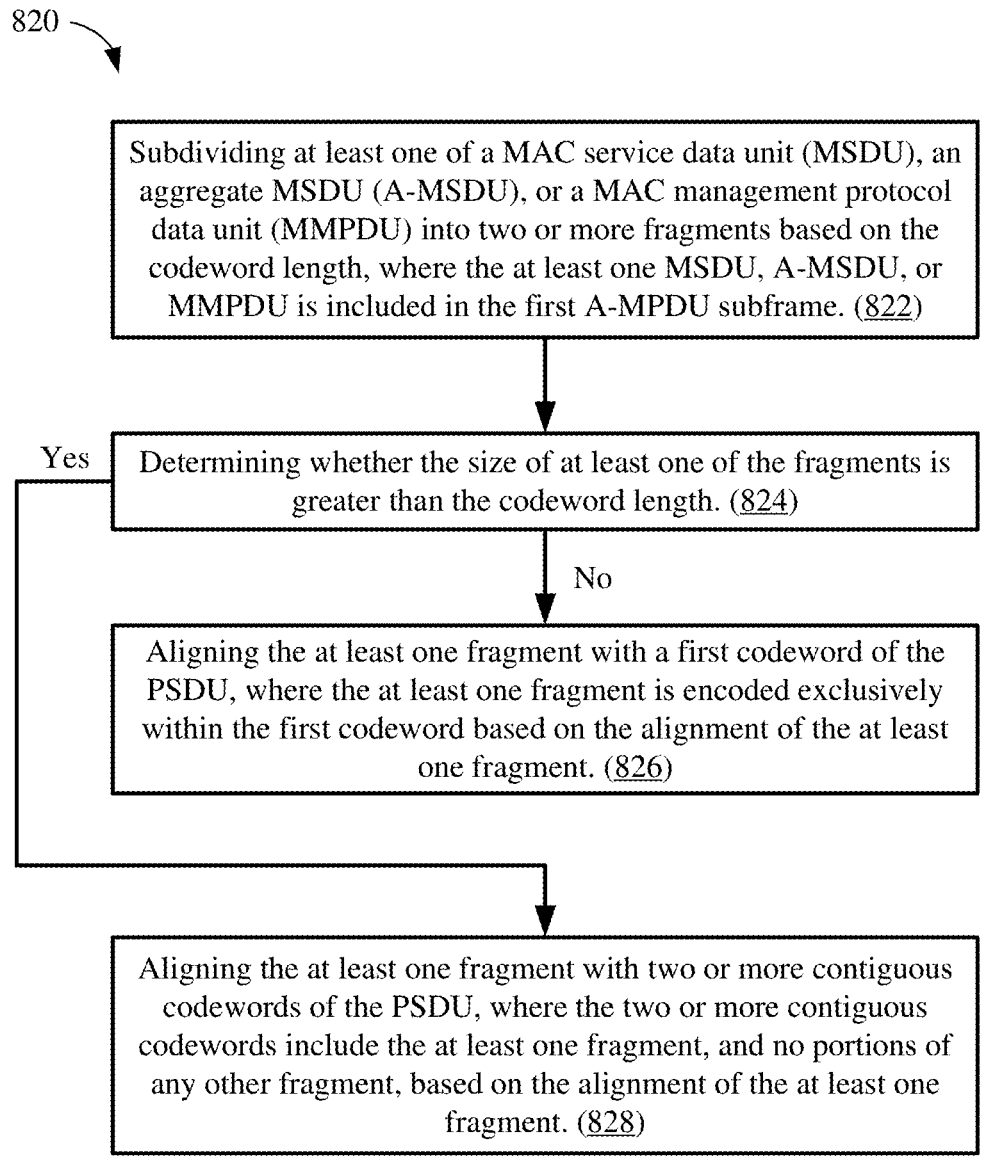
FIG. 8C shows a flowchart illustrating an example process for wireless communication that supports MPDU and codeword alignment and validation according to some implementations.

FIG. 8C shows a flowchart illustrating an example process 820 for wireless communication that supports MPDU and codeword alignment and validation according to some implementations. The process 820 may be performed by a wireless communication device such as the wireless communication device 500 described above with reference to FIG. 5. In some implementations, the process 820 may be performed by a wireless communication device operating as or within a STA, such as one of the STAs 104 and 604 described above with reference to FIGS. 1 and 6B, respectively. In other implementations, the process 820 may be performed by a wireless communication device operating as or within an AP, such as one of the APs 102 and 602 described above with reference to FIGS. 1 and 6A, respectively.

With reference to FIG. 8A, the process 820 may be a more detailed implementation of the A-MPDU and codeword alignment operation described in block 806 of the process 800. For example, the process 820 may begin, in block 822, after the determination of the codeword length in block 802 and the determination of the A-MPDU subframe size in block 804 of the process 800.

In block 822, the process 820 begins by subdividing at least one of a MAC service data unit (MSDU), an aggregate MSDU (A-MSDU), or a MAC management protocol data unit (MMPDU) into two or more fragments based on the codeword length, where the at least one MSDU, A-MSDU, or MMPDU is included in the first A-MPDU subframe. In block 824, the process 820 proceeds with determining whether the size of at least one of the fragments is greater than the codeword length. If the size of the at least one fragment is not greater than the codeword length, the process 820 proceeds to block 826 with aligning the at least one fragment with a first codeword of the PSDU, where the at least one fragment is encoded exclusively within the first codeword based on the alignment of the at least one fragment. Conversely, if the size of the at least one fragment is determined to be greater than the codeword length in block 824, the process 820 proceeds to block 828 with aligning the at least one fragment with two or more contiguous codewords of the PSDU, where the two or more contiguous codewords include the at least one fragment, and no portions of any other fragment, based on the alignment of the at least one fragment.

In some implementations, the at least one fragment may be aligned with one or more codewords in the PSDU by padding the end of the at least one fragment or another fragment associated with the PSDU. More specifically, the padding may determine the bit position of the at least one fragment within the PSDU. In some aspects, the padding may include a predetermined bit sequence. In some other aspects, the padding may include one or more MPDU delimiters. In some examples, at least one of the MPDU delimiters may have a length field value of zero. In another example, one or more of the MPDU delimiters may have a length field value greater than zero but less than four.

FIG. 8D shows a flowchart illustrating an example process 830 for wireless communication that supports MPDU and codeword alignment and validation according to some implementations. The process 830 may be performed by a wireless communication device such as the wireless communication device 500 described above with reference to FIG. 5. In some implementations, the process 830 may be performed by a wireless communication device operating as or within a STA, such as one of the STAs 104 and 604 described above with reference to FIGS. 1 and 6B, respectively. In other implementations, the process 830 may be performed by a wireless communication device operating as or within an AP, such as one of the APs 102 and 602 described above with reference to FIGS. 1 and 6A, respectively.

With reference to FIG. 8A, the process 820 may be a more detailed implementation of the PSDU encoding operation described in block 808 of the process 800. For example, the process 830 may begin, in block 832, after the determination of the codeword length in block 802, after the determination of the A-MPDU subframe size in block 804, and after the A-MPDU and codeword alignment in block 806 of the process 800.

In block 832, the process 830 begins by generating one or more cyclic redundancy check (CRC) sequences based on a plurality of payload bits associated with the PSDU, where the one or more CRC sequences is encoded with the plurality of payload bits to produce the one or more codewords. In block 834, the process 830 proceeds with grouping the one or more codewords into one or more codeword groups, where the one or more CRC sequences includes a respective CRC sequence of each of the one or more codeword groups.

FIG. 9A shows a flowchart illustrating an example process 900 for wireless communication that supports MPDU and codeword alignment and validation according to some other implementations. The process 900 may be performed by a wireless communication device such as the wireless communication device 500 described above with reference to FIG. 5. In some implementations, the process 900 may be performed by a wireless communication device operating as or within a STA, such as one of the STAs 104 and 604 described above with reference to FIGS. 1 and 6B, respectively. In other implementations, the process 900 may be performed by a wireless communication device operating as or within an AP, such as one of the APs 102 and 602 described above with reference to FIGS. 1 and 6A, respectively.

In some implementations, the process 900 begins in block 902 with receiving, from a transmitting device, a physical-layer protocol data unit (PPDU) including one or more codewords. In block 904, the process 900 proceeds with decoding the received codewords to recover a payload of the PPDU, where the decoded codewords include one or more cyclic redundancy check (CRC) sequences. In block 906, the process 900 proceeds with validating the decoded codewords, in a physical (PHY) layer of the wireless communication device, based on the one or more CRC sequences. In some implementations, the one or more CRC sequences may include a respective CRC sequence for each group of one or more codewords.

FIG. 9B shows a flowchart illustrating an example process 910 for wireless communication that supports MPDU and codeword alignment and validation according to some other implementations. The process 910 may be performed by a wireless communication device such as the wireless communication device 500 described above with reference to FIG. 5. In some implementations, the process 910 may be performed by a wireless communication device operating as or within a STA, such as one of the STAs 104 and 604 described above with reference to FIGS. 1 and 6B, respectively. In other implementations, the process 910 may be performed by a wireless communication device operating as or within an AP, such as one of the APs 102 and 602 described above with reference to FIGS. 1 and 6A, respectively.

In some implementations, the process 910 begins after the process 900 described with reference to FIG. 9A. For example, the process 910 may begin, in block 912, after the decoded codewords are validated based at least in part on the one or more CRC sequences in block 906 of the process 900.

In block 912, the process 910 begins by determining, based on the CRC sequences, that one or more of the codewords or groups of codewords were not correctly decoded by the wireless communication device. In some implementations, the one or more codewords or groups of codewords that were not correctly decoded by the wireless communication device may nonetheless include valid low-density parity-check (LDPC) codewords. In block 914, the process 910 proceeds with transmitting, to the transmitting device, a hybrid automatic repeat request (HARQ) feedback frame identifying the one or more codewords or groups of codewords that were not correctly decoded.

Figure 10:
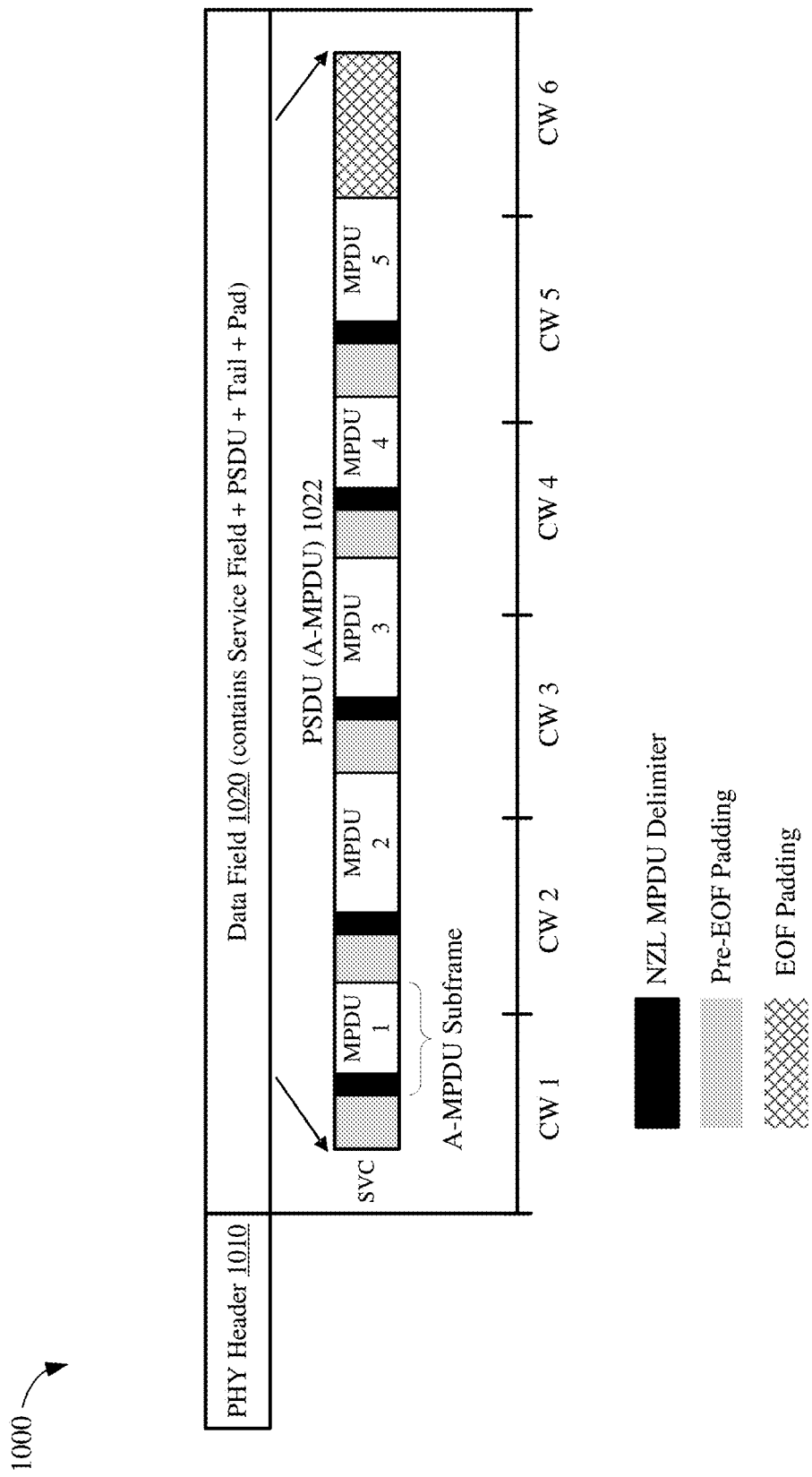
FIG. 10 shows an example PPDU usable for communications between wireless communication devices.

FIG. 10 shows an example PPDU 1000 usable for communications between wireless communication devices. In some aspects, the PPDU 1000 may be an example implementation of the PPDU 400 described with respect to FIG. 4. The PPDU 1000 includes a PHY header 1010 and a data field 1020. For example, the PHY header 1010 may include or correspond to the PHY preamble 402 of FIG. 4. The data field 1020 may include a service field (SVC), one or more PSDUs (such as the PSDU 404), a tail, and padding. Although only a single PSDU 1022 is shown in the example of FIG. 10, the data field 1020 may include multiple PSDUs in other implementations.

As described with respect to FIG. 4, the PSDU 1022 may carry an A-MPDU frame (such as the A-MPDU frame 408) which includes an aggregation of multiple MPDUs (such as MPDU1-MPDU5). Each MPDU is preceded by a non-zero length (NZL) MPDU delimiter (shown in black). The MPDU delimiter provides the length (in octets) of the following MPDU. The MPDU delimiter may include an end of frame (EOF) field set to 1 if soliciting an acknowledgement (ACK) for the corresponding MPDU or 0 if no acknowledgement is solicited (or if soliciting a block acknowledgement) for the corresponding MPDU. The end of each MPDU may be padded with 0 to 3 octets so that the size of the MPDU is a multiple of 4 octets. Each MPDU, together with the preceding NZL MPDU delimiter, comprises an A-MPDU subframe.

The PSDU 1022 also may include pre-EOF padding (shown in gray) and EOF padding (shown in a cross-hatch pattern). The pre-EOF padding may comprise one or more zero-length MPDU delimiters with an EOF field set to 0. Segments of pre-EOF padding may be inserted between A-MPDU subframes, for example, to give the receiving device additional time to process the MPDUs. The length of each segment of pre-EOF padding may be a multiple of 4 octets. The EOF padding may comprise one or more zero-length MPDU delimiters with an EOF field set to 1. The EOF padding may be added to the end of the last A-MPDU subframe of the PSDU 1022, for example, to give the receiving device additional time to send responses or for PPDU alignment. The length of the EOF padding may be a multiple of 4 octets. For purposes of distinguishing the pre-EOF padding and EOF padding from A-MPDU subframes that contain an MPDU (and NZL MPDU delimiter), the former will be referred to herein simply as "padding bits."

The PSDU 1022 is encoded, in the PHY, into a number of codewords CW1-CW6. Although six codewords CW1-CW6 are shown in the example of FIG. 10, the PSDU 1022 may include fewer or more codewords in other implementations. For example, the codeword length and number of codewords to be used for encoding a PSDU may depend, at least in part, on the size of the payload. In some aspects, the PSDU 1022 may be encoded using LDPC encoding techniques. Accordingly, each codeword may include a number of information bits and a number of parity bits. The information bits may represent the payload of the PSDU 1022 and the parity bits may be used to detect, and in some instances correct, errors in the corresponding codeword.

As shown in FIG. 10, the MPDUs are not aligned with the codeword boundaries in the PSDU 1022. For example, a portion of MPDU1 will be encoded into CW1 while the remainder of MPDU1 will be encoded into CW2. Furthermore, a portion of MPDU2 will be encoded into CW2 while the remainder of MPDU2 will be encoded into CW3. As a result, CW2 will include portions (but not the entireties) of two different MPDUs (such as MPDU1 and MPDU2). This may increase the overhead required to retransmit either of the MPDUs. For example, when a list decoder is used for LDPC decoding, CW1 and CW2 may each be decoded to valid LDPC codewords, however, CW2 may be decoded to the wrong codeword. In other words, CW2 may pass the LDPC parity check (in the PHY), but the included payload data corresponding to MPDU1 or MPDU2 may still be received in error. For example, MPDU1 may fail the FCS validation step (in the MAC layer). Because CW1 and CW2 both represent valid codewords, the MAC layer of the receiving device may be unable to determine whether CW1 or CW2 was received in error. Thus, a HARQ retransmission request for MPDU1 may need to include both of the codewords CW1 and CW2. Even if CW2 failed the LDPC parity check, the receiving device would need to store CW1 in memory until completion of the HARQ sequence (since CW1 includes useful MPDU information).

Aspects of the present disclosure may align A-MPDU subframes with codeword boundaries in a PSDU. For example, the alignment may be performed by padding the ends of one or more A-MPDU subframes with a predetermined bit sequence or a number of MPDU delimiters. In some aspects, an A-MPDU subframe may be aligned with an LDPC codeword so that the A-MPDU subframe is encoded exclusively within a single codeword. In some other aspects, an A-MPDU subframe may be aligned with two or more contiguous LDPC codewords so that the two or more contiguous codewords include the A-MPDU subframe and no portions of any other A-MPDU subframe.

Figure 11A:
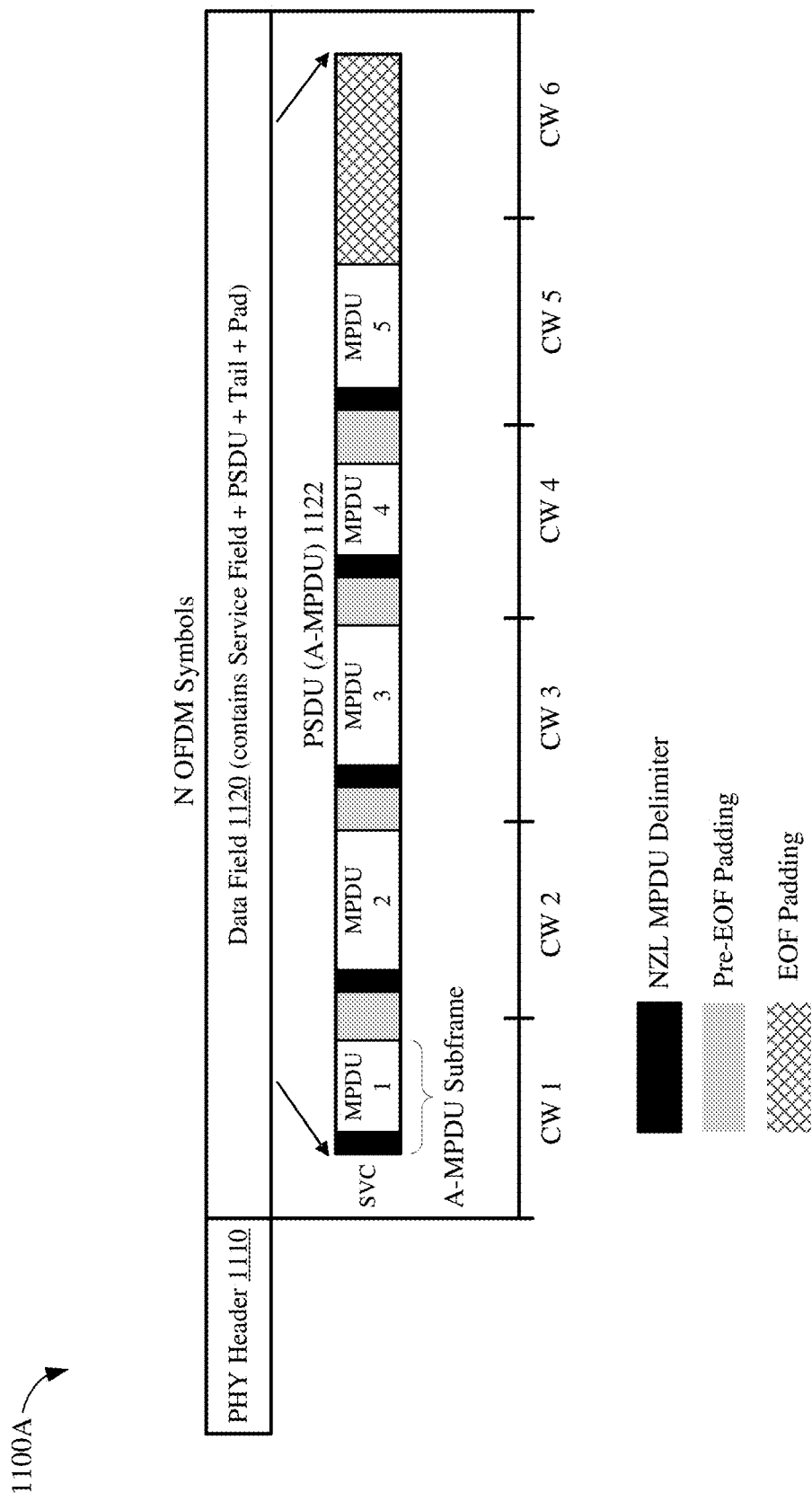
FIG. 11A shows a PPDU usable for communications in some examples of the processes of FIGS. 7A, 7B, and 7C.

FIG. 11A shows a PPDU 1100A usable for communications in some examples of the processes of FIGS. 7A, 7B, and 7C. In some aspects, the PPDU 1100A may be an example implementation of the PPDU 400 described with respect to FIG. 4. The PPDU 1100A includes a PHY header 1110 and a data field 1120. For example, the PHY header 1110 may include or correspond to the PHY preamble 402 of FIG. 4. The data field 1120 may include a service field (SVC), one or more PSDUs (such as the PSDU 404), a tail, and padding. Although only a single PSDU 1122 is shown in the example of FIG. 11A, the data field 1120 may include multiple PSDUs in other implementations.

The PSDU 1122 may carry an A-MPDU frame which includes an aggregation of multiple MPDUs (such as MPDU1-MPDU5). In some implementations, each of the MPDUs may be aligned with a different codeword. More specifically, each A-MPDU subframe may be encoded exclusively within a single LDPC codeword of the PSDU 1122. For example, CW1 includes the entirety of MPDU1 and a corresponding NZL MPDU delimiter, CW2 includes the entirety of MPDU2 and a corresponding NZL MPDU delimiter, CW3 includes the entirety of MPDU3 and a corresponding NZL MPDU delimiter, CW4 includes the entirety of MPDU4 and a corresponding NZL MPDU delimiter, CW5 includes the entirety of MPDU5 and a corresponding NZL MPDU delimiter, and CW6 includes only the EOF padding.

As shown in FIG. 11A, each of the A-MPDU subframes is entirely bounded by a respective codeword boundary in the PSDU 1122. In some implementations, padding bits may be added or inserted between A-MPDU subframes to ensure proper alignment between the MPDUs and the codeword boundaries. For example, the padding bits may be used to adjust the distance of separation between consecutive A-MPDU subframes such that each A-MPDU subframe can be encoded exclusively within a respective LDPC codeword. In some aspects, the padding bits may include pre-EOF padding (which may be any multiple of 4 octets), a predetermined bit sequence (which may be any bit size), or any combination thereof.

In the example of FIG. 11A, the one-to-one relationship between the MPDUs and the LDPC codewords enables HARQ processes to be performed at a very fine granularity. For example, if CW1 is decoded to an incorrect (but valid) codeword, MPDU1 may still fail the FCS validation step. However, because MPDU1 is encoded exclusively within CW1, a HARQ retransmission request associated with MPDU1 would need to include only CW1. On the other hand, if CW2 is decoded to the correct codeword, MPDU2 will pass the FCS validation step. Because no other MPDUs share the same codeword as MPDU2, CW2 does not need to be retained in memory (such as for a HARQ sequence involving any other MPDU). Accordingly, each received codeword can be safely discarded upon successful validation of a corresponding MPDU.

Figure 11B:
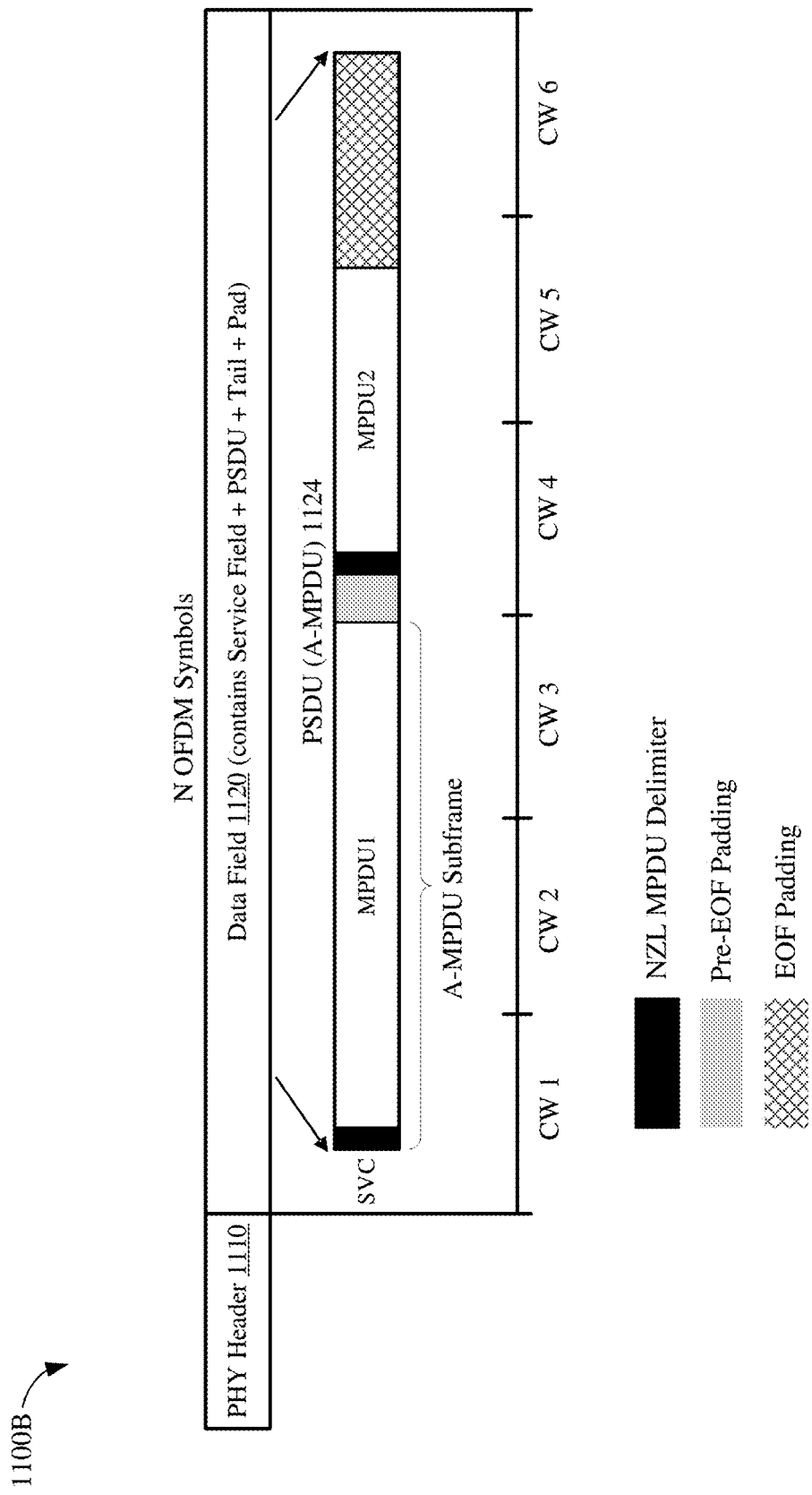
FIG. 11B shows a PPDU usable for communications in some other examples of the processes of FIGS. 7A, 7B, and 7C.

FIG. 11B shows a PPDU 1100B usable for communications in some other examples of the processes of FIGS. 7A, 7B, and 7C. In some implementations, the PPDU 1100B is similar to the PPDU 1100A of FIG. 11A, except that the data field 1120 includes MPDUs that are greater in size than the codeword length. Although only a single PSDU 1124 is shown in the example of FIG. 11B, the data field 1120 may include multiple PSDUs in other implementations.

The PSDU 1124 may carry an A-MPDU frame which includes an aggregation of multiple MPDUs (such as MPDU1 and MPDU2). In some implementations, each of the MPDUs may be aligned with multiple contiguous codewords. More specifically, each A-MPDU subframe may be encoded exclusively within a unique group of LDPC codewords of the PSDU 1126. For example, CW1-CW3 include the entirety of MPDU1 and a corresponding NZL MPDU delimiter, CW4 and C5 include the entirety of MPDU2 and a corresponding NZL MPDU delimiter, and CW6 includes only the EOF padding.

As shown in FIG. 11B, each of the A-MPDU subframes is entirely bounded by the beginning and end of the first and last codewords, respectively, of a given codeword group in the PSDU 1126. In some implementations, padding bits may be added or inserted between A-MPDU subframes to ensure proper alignment between the MPDUs and the codeword boundaries. For example, the padding bits may be used to adjust the distance of separation between consecutive A-MPDU subframes such that each A-MPDU subframe can be represented exclusively by a respective group of contiguous codewords. In some aspects, the padding bits may include pre-EOF padding (which may be any multiple of 4 octets), a predetermined bit sequence (which may be any bit size), or any combination thereof.

In the example of FIG. 11B, the unique relationship between the MPDUs and the LDPC codewords enables HARQ processes to be performed at a relatively fine granularity. For example, if CW1-CW3 are decoded to the correct codewords, MPDU1 will pass the FCS validation step. Because no other MPDUs share the same group of codewords as MPDU, CW1-CW3 do not need to be retained in memory (such as for a HARQ sequence involving any other MPDU). Accordingly, multiple codewords can be safely discarded upon successful validation of a single MPDU. On the other hand, if CW4 is decoded to the correct codeword, but CW5 is decoded to an incorrect (but valid) codeword, MPDU2 may still fail the FCS validation step. Because MPDU2 is distributed across CW4 and CW5, a HARQ retransmission request associated with MPDU2 would need to include both codewords CW4 and CW5.

In some implementations, larger MSDUs, A-MSDUs, or MMPDUs (that would otherwise be included in a large MPDU) may be subdivided into multiple fragments. For example, rather than encode a single large MPDU across several LDPC codewords, the MSDUs or A-MSDUs to be included in the large MPDU may instead be fragmented (such as into 15 fragments) to support a more optimal alignment with the codeword boundaries of a corresponding PSDU. In some aspects, fragments that are smaller than the codeword length may be aligned with a single codeword in the PSDU (such as described with respect to FIG. 11A). In some other aspects, fragments that are larger than the codeword length may be aligned with multiple codewords in the PSDU (such as described with respect to FIG. 11B).

Aspects of the present disclosure recognize that fragmenting an MPDU may further increase the overhead required to transmit (or retransmit) one or more codewords. For example, each fragment may be encapsulated as a separate MPDU with a unique fragment identifier (ID). A single PSDU may support up to 1024 MPDUs or fragments. The overhead associated with each fragment may include at least an NZL MPDU delimiter (4 bytes), an MPDU header (30-46 bytes, but may be optimized), an FCS (4 bytes), and any padding bits needed to align the MPDU with codeword boundaries in the PSDU. If an MPDU is split into multiple fragments, the MPDU header may be present in all fragments, which results in large overhead. To reduce overhead, the MPDU header may be present only in one fragment (e.g., the first fragment) or a few fragments, but not in other fragments.

The minimum overhead needed to support fragmentation may depend, at least in part, on the code rate (R) and the number of LDPC codewords per group (N). At least 0-7 padding bits may be used to align MPDU and codeword boundaries because the number of information bits in each LDPC codeword is not necessarily a multiple of 8. Assuming that at least 8 bytes (for the NZL MPDU delimiter and FCS), plus another 0-7 bits (of padding), constitute a "minimum overhead" requirement for each additional fragment, the fragmentation overhead (per fragment) can be determined, for example, according to Table 1, below:

TABLE 1

| Code Rate (R) | LDPC codeword block length $L_{CW}$ (bits) | Number of bits $L_{infobit}$ | LDPC information block length $L_{infobit} = L_{CW} R$ Number of bytes $L_{infobyte} = \frac{L_{infobit}}{8}$ | Minimum Overhead % $\frac{NL_{infobyte} - (\lfloor NL_{infobyte} \rfloor - 8)}{\lfloor NL_{infobyte} \rfloor - 8}$ | |
|---|---|---|---|---|---|
| | | | | N = 1 | N = 2 |
| 1/2 | 1944 | 972 | 121.5 | 7.5% | 3.4% |
| 2/3 | 1944 | 1296 | 162 | 5.2% | 2.5% |
| 3/4 | 1944 | 1458 | 182.25 | 4.7% | 2.4% |
| 5/6 | 1944 | 1620 | 202.5 | 4.4% | 2.0% |

Figure 11C:
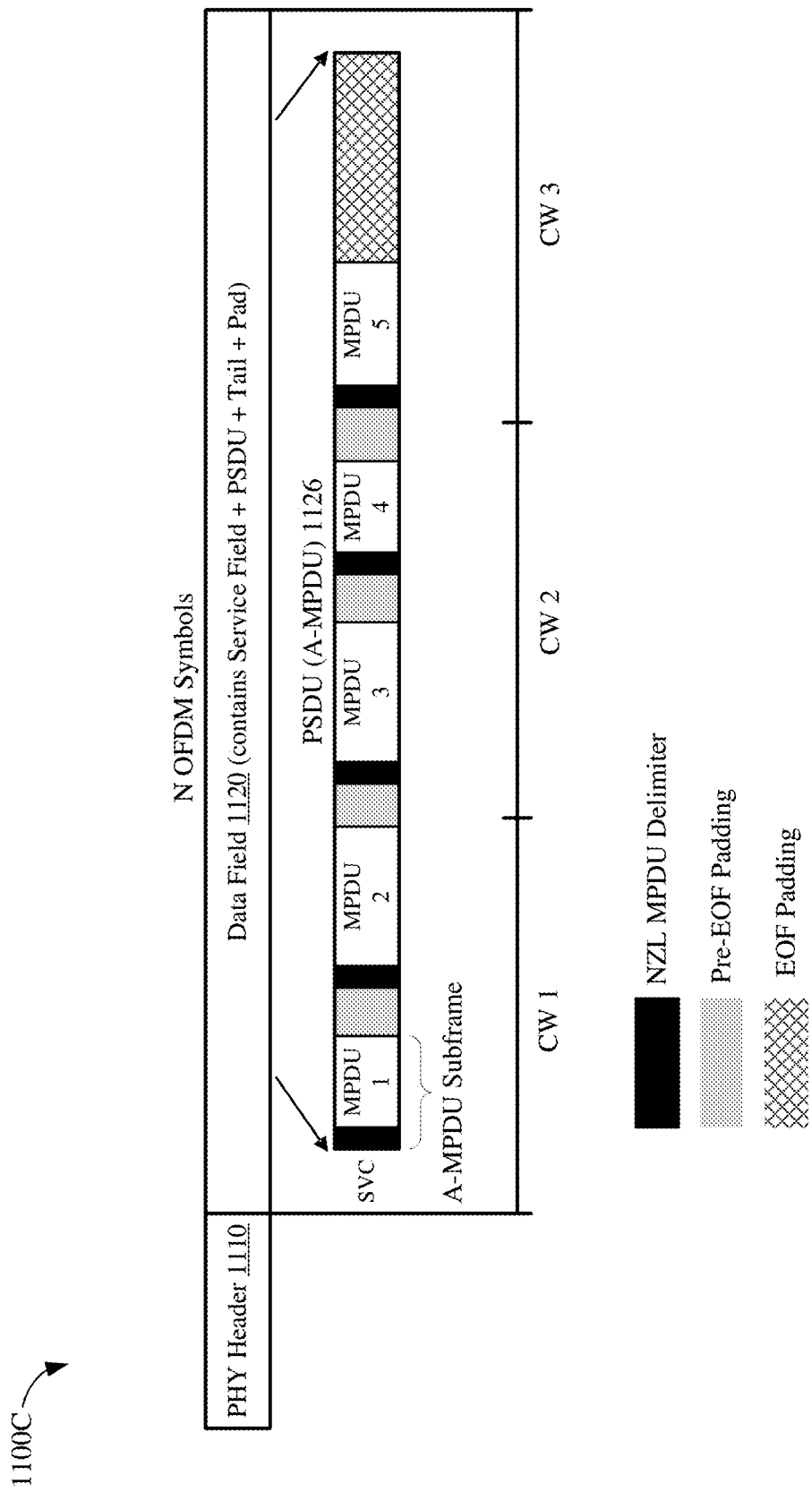
FIG. 11C shows a PPDU usable for communications in some other examples of the processes of FIGS. 7A, 7B, and 7C.

FIG. 11C shows a PPDU 1100C usable for communications in some other examples of the processes of FIGS. 7A, 7B, and 7C. In some implementations, the PPDU 1100C is similar to the PPDU 1100A of FIG. 11A, except that the data field 1120 includes MPDUs that are significantly smaller in size than the codeword length. Although only a single PSDU 1126 is shown in the example of FIG. 11C, the data field 1120 may include multiple PSDUs in other implementations.

The PSDU 1126 may carry an A-MPDU frame which includes an aggregation of multiple MPDUs (such as MPDU1-MPDU5). In some implementations, multiple MPDUs may be aligned with the same codeword. More specifically, multiple A-MPDU subframes may be encoded entirely within a single LDPC codeword of the PSDU 1126. For example, CW1 includes the entireties of MPDU1 and MPDU2 along with their respective NZL MPDU delimiters, CW2 includes the entireties of MPDU3 and MPDU4 along with their respective NZL MPDU delimiters, and CW3 includes the EOF padding as well as the entirety of MPDU5 and a corresponding NZL MPDU delimiter.

As shown in FIG. 11C, each of the A-MPDU subframes is entirely bounded by the codeword boundary for a single codeword in the PSDU 1126. In some implementations, padding bits may be added or inserted between A-MPDU subframes to ensure proper alignment between the MPDUs and the codeword boundaries. For example, the padding bits may be used to adjust the distance of separation between consecutive A-MPDU subframes such that each A-MPDU subframe can be encoded entirely within a corresponding LDPC codeword. In some aspects, the padding bits may include pre-EOF padding (which may be any multiple of 4 octets), a predetermined bit sequence (which may be any bit size), or any combination thereof.

In the example of FIG. 11C, the unique relationship between the MPDUs and the LDPC codewords enables HARQ processes to be performed at an even finer granularity. For example, if CW1 is decoded to an incorrect (but valid) codeword, MPDU1 or MPDU2 may still fail the FCS validation step. However, because MPDU1 and MPDU2 are encoded entirely within CW1, a HARQ retransmission request associated with either MPDU1 or MPDU2 would need to include only CW1. However, if one of the MPDUs (such as MPDU1) passes the FCS validation step while the other MPDU (such as MPDU2) does not, CW1 may not be discarded from memory since the codeword may still contain a useful MPDU.

In some implementations, smaller MSDUs (that would otherwise be included in a small MPDU) may be aggregated into a larger MPDU. For example, rather than encode multiple small MPDUs within a single LDPC codeword, the MSDUs to be included in the small MPDU may instead be aggregated (as an A-MSDU or MPDU) or otherwise combined to support a more optimal alignment with the codeword boundaries of a corresponding PSDU. In some aspects, A-MSDUs that are smaller than the codeword length may be aligned with a single codeword in the PSDU (such as described with respect to FIG. 11A). In some other aspects, A-MSDUs that are larger than the codeword length may be aligned with multiple codewords in the PSDU (such as described with respect to FIG. 11B).

Figure 12A:
FIG. 12A shows an example MAC padding configuration according to some implementations.

FIG. 12A shows an example MAC padding configuration 1200 according to some implementations. In some implementations, the MAC padding configuration 1200 may be used to implement any of the PPDUs 1100A-1100C described with respect to FIGS. 11A-11C, respectively. In the example of FIG. 12A, the MAC padding configuration 1200 may be based on a presumption that any codeword length and packet size may be used for MPDU and codeword alignment. As shown in FIG. 12A, the MAC padding configuration 1200 includes 3 cases for calculating the amount of MAC padding to be implemented for MPDU and codeword alignment.

The first case (Case 1) is triggered when there is only one LDPC codeword in the PSDU ($N_{CW}=1$). Since there is only one codeword, the entirety of the A-MPDU subframe will necessarily be encoded exclusively within a single LDPC codeword, and therefore no MAC padding is needed for alignment.

The second case (Case 2) is triggered when there are exactly two LDPC codewords, each of length 1296 ($L_{LDPC}=1296$), in the PSDU ($N_{CW}=2$). Since there are multiple codewords, MAC padding may be inserted between A-MPDU subframes to ensure proper alignment between the MPDUs and the LDPC codewords. As shown in FIG. 12A, there are two possible codeword lengths after MAC padding in the second case. For example, the codeword length may be 1944 bits when $N_{avbits} \geq N_{pld}+2916*(1-R)$, and 1296 bits otherwise; where R is the code rate, $N_{avbits}$ is the number of available bits, and $N_{pld}$ is the number of payload bits. Thus, codeword length may increase after MAC padding.

The third case (Case 3) is triggered when there are multiple LDPC codewords, each of length 1944 ($L_{LDPC}=1944$), in the PSDU ($N_{CW}=N_{pld}/[1944*R]$). Since there are multiple codewords, MAC padding may be inserted between A-MPDU subframes to ensure proper alignment between the MPDUs and the LDPC codewords. As shown in FIG. 12A, the codeword length is at a maximum (1944) in the third case, and therefore will not change with the additional MAC padding. However, the number of codewords may increase after MAC padding and therefore may need to be updated.

Figure 12B:
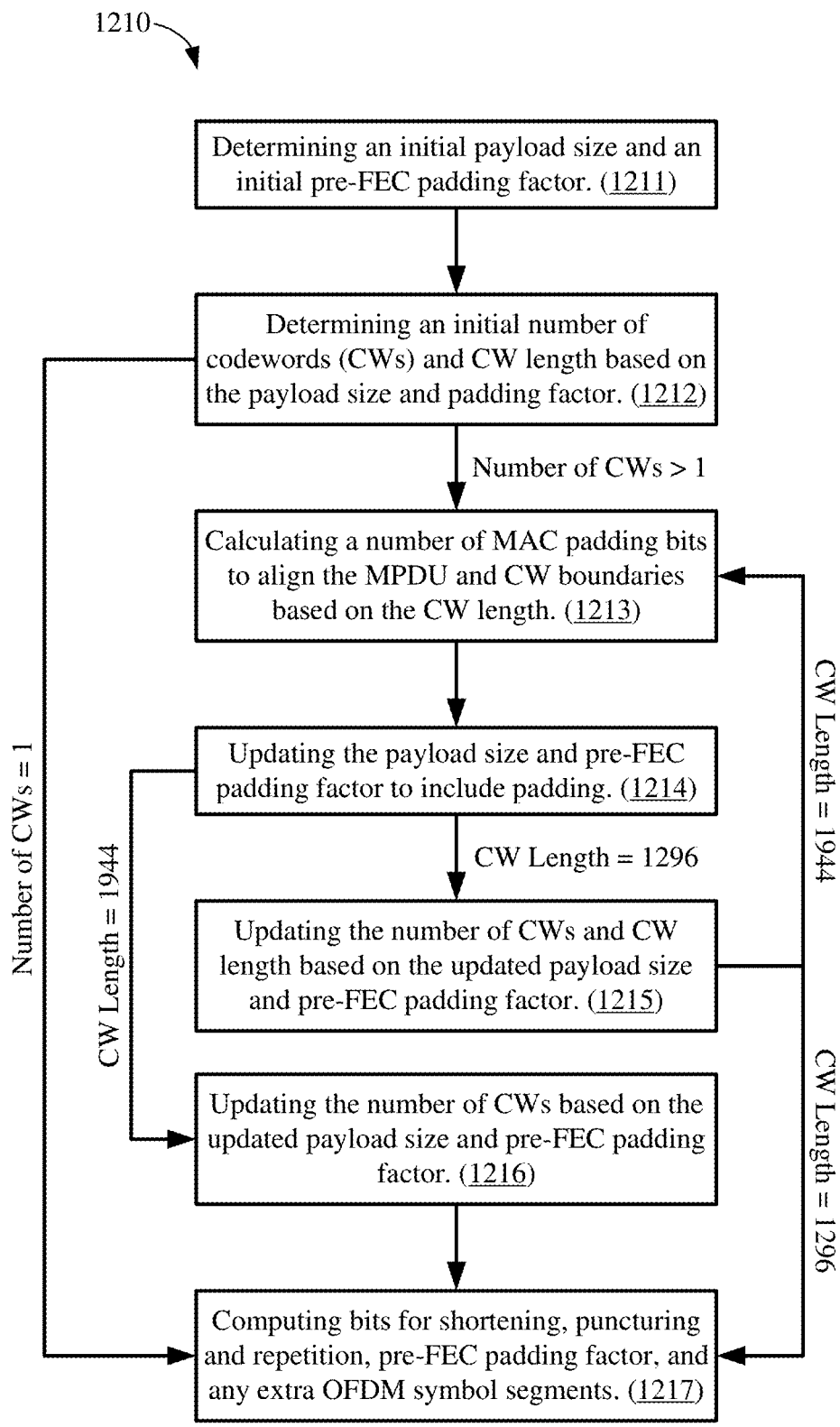
FIG. 12B shows a flowchart illustrating a process for MAC padding according to the configuration of FIG. 12A.

FIG. 12B shows a flowchart illustrating a process 1210 for MAC padding according to the configuration 1200 of FIG. 12A. The process 1210 may be performed by a wireless communication device such as the wireless communication device 500 described above with reference to FIG. 5. In some implementations, the process 1210 may be performed by a wireless communication device operating as or within a STA, such as one of the STAs 104 and 604 described above with reference to FIGS. 1 and 6B, respectively. In other implementations, the process 1210 may be performed by a wireless communication device operating as or within an AP, such as one of the APs 102 and 602 described above with reference to FIGS. 1 and 6A, respectively.

In some implementations, the process 1210 begins in block 1211 with determining an initial payload size and an initial pre-FEC padding factor. In block 1212, the process 1210 proceeds with determining an initial number of codewords and a codeword length based on the payload size and the padding factor. If the number of codewords is equal to 1 (Case 1), the process 1210 proceeds to block 1217 with computing bits for shortening puncturing and repetition, pre-FEC padding factor, and any extra OFDM symbol segments.

Conversely, if the number of codewords is greater than 1 (Case 2 or 3), the process 1210 proceeds to block 1213 with calculating a number of MAC padding bits to align the MPDU and codeword boundaries based on the codeword length. In block 1214, the process 1210 proceeds with updating the payload size and the pre-FEC padding factor to include the MAC padding. If the codeword length is equal to 1944 (Case 3), the process 1210 proceeds to block 1216 with updating the number of codewords based on the updated payload size and the pre-FEC padding factor. The process 1210 then proceeds to block 1217.

Conversely, if the codeword length is equal to 1296 (Case 2), the process 1210 proceeds to block 1215 with updating the number of codewords and the codeword length based on the updated payload size and the updated pre-FEC padding factor. If the updated codeword length is equal to 1944, the process 1210 proceeds to block 1213 with re-calculating the number of MAC padding bits to align the MPDU and codeword boundaries based on the updated codeword length. Conversely, if the updated codeword length is equal to 1296, the process 1210 then proceeds to block 1217.

FIG. 13A shows an example MAC padding configuration 1300 according to some other implementations. In some implementations, the MAC padding configuration 1300 may be used to implement any of the PPDUs 1100A-1100C described with respect to FIGS. 11A-11C, respectively. In the example of FIG. 13A, the MAC padding configuration 1300 may be based on a presumption that MPDU and codeword alignment may be trivial or otherwise unnecessary for relatively short packets (which encompass only 1 or 2 codewords). As shown in FIG. 13A, the MAC padding configuration 1300 includes 2 cases for calculating the amount of MAC padding to be implemented for MPDU and codeword alignment.

The first case (Case 1) is triggered when there are only one or two LDPC codewords in the PSDU ($N_{CW}=1$ or 2). Because there can be at most two codewords, the entirety of the A-MPDU subframe will necessarily be encoded within a relatively small codeword group, and thus any corresponding HARQ sequence will have a relatively fine granularity. Therefore, no MAC padding is needed for alignment.

The second case (Case 2) is triggered when there are multiple LDPC codewords, each of length 1944 ($L_{LDPC}=1944$), in the PSDU ($N_{CW}=N_{pld}/[1944*R]$). Since there are multiple codewords, MAC padding may be inserted between A-MPDU subframes to ensure proper alignment between the MPDUs and the LDPC codewords. As shown in FIG. 13A, the codeword length is at a maximum (1944) in the third case, and therefore will not change with the additional MAC padding. However, the number of codewords may increase after MAC padding and therefore may need to be updated.

Figure 13B:
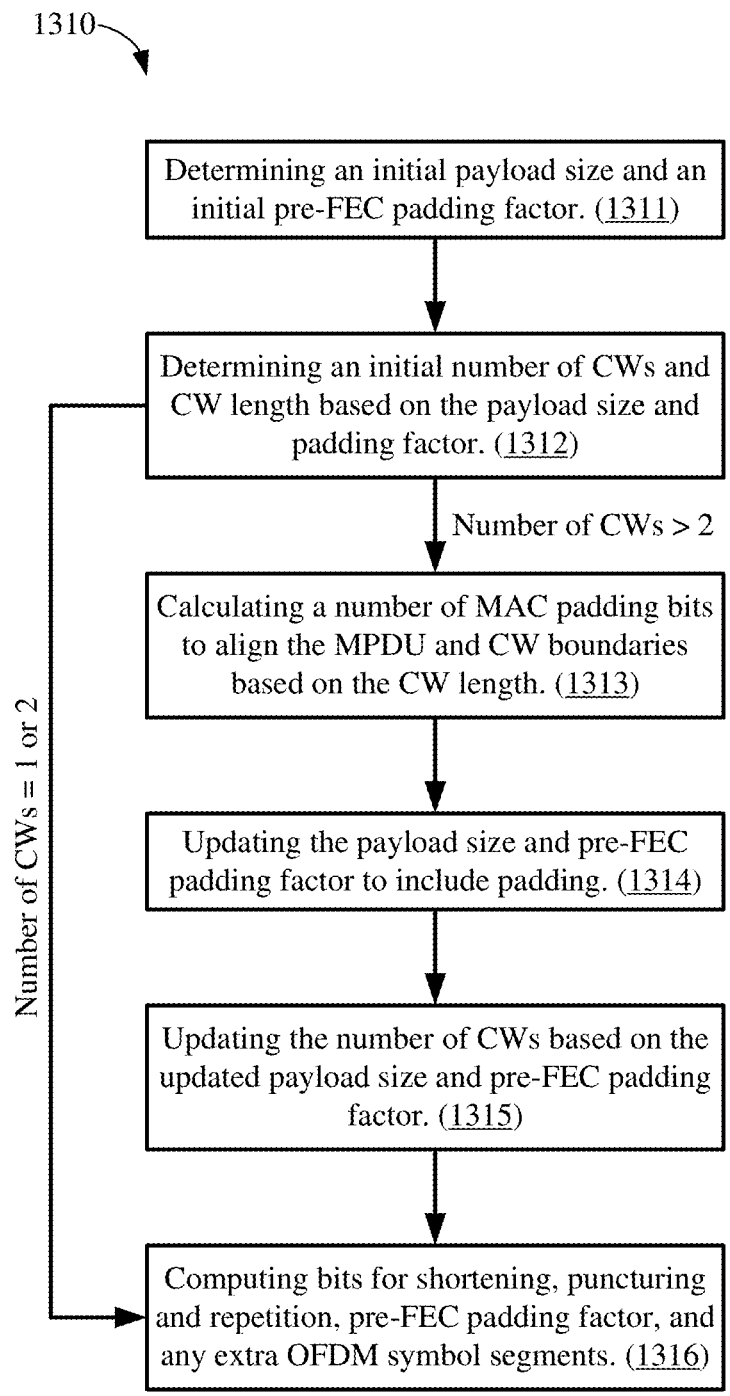
FIG. 13B shows a flowchart illustrating a process for MAC padding according to the configuration of FIG. 13A.

FIG. 13B shows a flowchart illustrating a process 1310 for MAC padding according to the configuration 1300 of FIG. 13A. The process 1310 may be performed by a wireless communication device such as the wireless communication device 500 described above with reference to FIG. 5. In some implementations, the process 1310 may be performed by a wireless communication device operating as or within a STA, such as one of the STAs 104 and 604 described above with reference to FIGS. 1 and 6B, respectively. In other implementations, the process 1310 may be performed by a wireless communication device operating as or within an AP, such as one of the APs 102 and 602 described above with reference to FIGS. 1 and 6A, respectively.

In some implementations, the process 1310 begins in block 1311 with determining an initial payload size and an initial pre-FEC padding factor. In block 1312, the process 1310 proceeds with determining an initial number of codewords and a codeword length based on the payload size and the padding factor. If the number of codewords is equal to 1 or 2 (Case 1), the process 1310 proceeds to block 1316 with computing bits for shortening puncturing and repetition, pre-FEC padding factor, and any extra OFDM symbol segments.

Conversely, if the number of codewords is greater than 2 (Case 2), the process 1310 proceeds to block 1313 with calculating a number of MAC padding bits to align the MPDU and codeword boundaries based on the codeword length. In block 1314, the process 1310 proceeds with updating the payload size and the pre-FEC padding factor to include the MAC padding. In block 1315, the process 1310 proceeds with updating the number of codewords based on the updated payload size and the pre-FEC padding factor. The process 1310 then proceeds to block 1316.

Aspects of the present disclosure recognize that, without the MAC padding procedures described with respect to FIGS. 11A-13C, at least some of the MPDUs are likely not to be aligned with the codeword boundaries in the (such as shown in FIG. 10). As a result, HARQ processes may require substantial overhead (such as to retransmit multiple codewords for a single MPDU or to store valid codewords containing partial MPDUs).

In some implementations, a pre-FEC CRC may be used to validate one or more LDPC codewords or groups of codewords. For example, prior to LDPC encoding, a CRC sequence may be inserted into each set of payload bits (or information bits) to be encoded as an LDPC codeword or group of codewords. The CRC sequences provide an additional layer of redundancy for performing error detection on the received codewords. More specifically, a receiving device may determine, based on the CRC sequences, whether one or more of the codewords or codeword groups include incorrect (but valid) LDPC codewords. For example, a codeword may pass the LDPC parity check, but the payload information (such as the MPDU) encoded therein may still be incorrect. In some implementations, the CRC validation may be performed in the PHY of the receiving device such that any incorrect codewords or groups of codewords can be requested (using a HARQ sequence) without further analyzing the MPDUs in the MAC layer.

Figure 14:
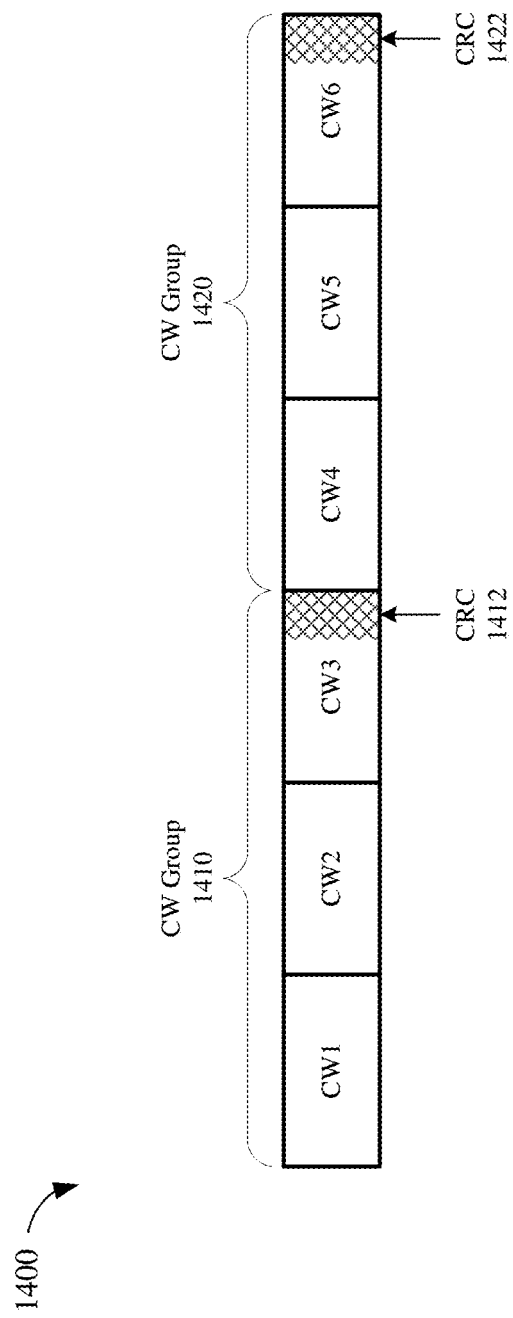
FIG. 14 shows a PPDU usable for communications in some examples of the process of FIG. 8.

FIG. 14 shows a PSDU 1400 usable for communications in some examples of the process of FIG. 8. In some aspects, the PSDU 1400 may be an example implementation of the PSDU 1022 described with respect to FIG. 10 or any of the PSDUs 1122-1126 described with respect to FIGS. 11A-11C. The PSDU 1400 is encoded as a number codewords CW1-CW6. In the example of FIG. 14, codewords are grouped into sets of three. For example, CW1-CW3 forms a first codeword group 1410 and CW4-CW6 forms a second codeword group 1420. Although three-codeword groupings are shown in the example of FIG. 14, codeword groups may include fewer or more codewords in other implementations.

In some implementations, each of the codeword groups 1410 and 1420 may include a CRC sequence 1412 and 1422, respectively. The CRC sequences 1412 and 1422 may be inserted into the payload bits (or information bits) associated with each codeword group 1410 and 1420, respectively, prior to LDPC encoding. More specifically, the CRC sequences 1412 and 1422 may be based on the payload bits of the respective CW groups 1410 and 1420. For example, an n-bit CRC may be used to validate every (N*R−n) payload bits, where R is the code rate and N is the number of codewords in a codeword group.

After LDPC encoding, the CRC sequences 1412 and 1422 may be encapsulated within one or more of the codewords forming the respective codeword groups 1410 and 1420. In other words, the CRC sequences 1412 and 1422 may be recovered by decoding the codewords in each group 1410 and 1420, respectively. In the example of FIG. 14, the CRC sequence 1412 can be recovered when CW3 is decoded and the CRC sequence 1422 can be recovered when CW6 is decoded. Although the CRC sequences are shown to be encapsulated by a single codeword at the end of each codeword group in the example of FIG. 14, CRC sequences may be distributed among any of the payload bits (or codewords) associated with a given codeword group in other implementations.

In some implementations, the CRC sequences 1412 and 1422 may be used to validate the LDPC codewords in the respective codeword groups 1410 and 1420. For example, the CRC sequence 1412 may be used to validate CW1-CW3 in the first codeword group 1410 and the CRC sequence 1422 may be used to validate CW4-CW6 the second CW group 1420. As described above, a codeword may pass the LDPC parity check even if the payload information encoded therein is incorrect. For example, the codeword may be decoded to the wrong (but valid) codeword. Thus, a receiving device may use the CRC sequences 1412 and 1422 to further validate the codewords in each of the respective codeword groups 1410 and 1420.

If a group of codewords passes the LDPC parity check but fails CRC validation, the receiving device may request retransmission of the corresponding group of codewords using a HARQ sequence. For example, if the first codeword group 1410 fails CRC validation based on the CRC sequence 1412, the receiving device may request retransmission of CW1, CW2, and CW3. In some implementations, the CRC validation may be performed in the PHY of the receiving device such that any incorrect codewords or groups of codewords can be requested without further analyzing (or performing FCS validation on) the MPDUs in the MAC layer. Accordingly, the CRC validation of the present implementations may be agnostic to the alignment between MPDUs and codeword boundaries in the PSDU 1400.

FIG. 15A shows an example pre-forward error correction (pre-FEC) cyclic redundancy check (CRC) configuration 1500 according to some implementations. In some implementations, the pre-FEC CRC configuration 1500 may be used to implement the PSDU 1400 described with respect to FIG. 14. In the example of FIG. 15A, the pre-FEC CRC configuration 1500 may be based on a presumption that pre-FEC CRC validation may be trivial or otherwise unnecessary for relatively short packets (which encompass only 1 or 2 codewords). As shown in FIG. 15A, the pre-FEC CRC configuration 1500 includes 2 cases for calculating the number of CRC bits to be added to a PSDU payload.

The first case (Case 1) is triggered when there are only one or two LDPC codewords in the PSDU ($N_{CW}$=1 or 2). Aspects of the present disclosure recognize that relatively short packets can efficiently rely on FCS validation (in the MAC layer). As described with respect to FIG. 13A, because there can be at most two codewords, the entirety of the A-MPDU subframe will necessarily be encoded within a relatively small codeword group, and thus any corresponding HARQ sequence will already have a relatively fine granularity. Thus, in some implementations, no CRC bits may be added in the first case. In some other implementations, a relatively small predetermined number of CRC bits (such as 16) may be added in the first case.

The second case (Case 2) is triggered when there are multiple LDPC codewords, each of length 1944 ($L_{LDPC}$=1944), in the PSDU ($N_{CW}$=$N_{pld}$/[1944*R]). Since there are multiple codewords, pre-FEC CRC bits may be added to the payload bits to provide a finer granularity of codeword validation. In some implementations, the multiple codewords may be grouped into one or more codeword groups, and a respective CRC sequence may be used to validate each codeword group (such as shown in FIG. 14).

Figure 15B:
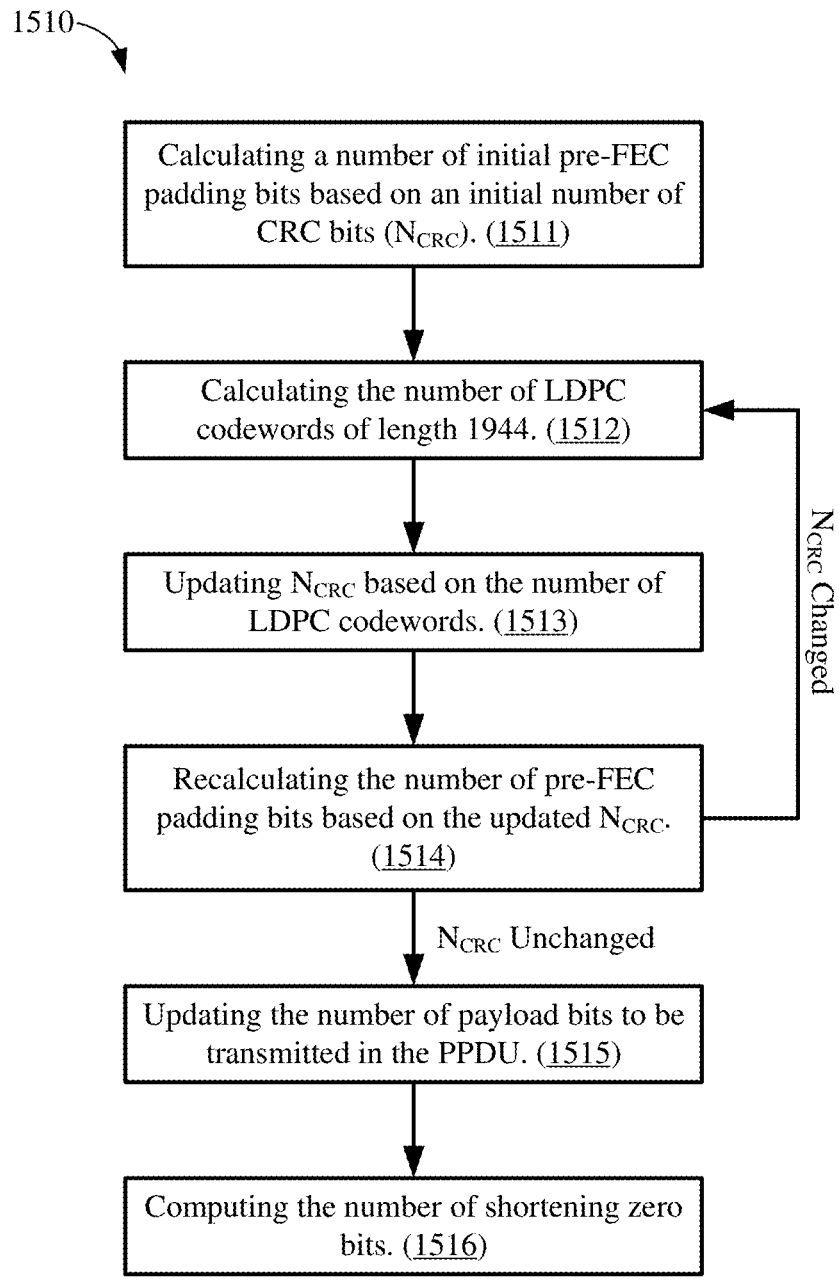
FIG. 15B shows a flowchart illustrating an encoding process with pre-FEC CRC according to the configuration of FIG. 15A.

FIG. 15B shows a flowchart illustrating an encoding process 1510 with pre-FEC CRC according to the configuration 1500 of FIG. 15A. The process 1510 may be performed by a wireless communication device such as the wireless communication device 500 described above with reference to FIG. 5. In some implementations, the process 1510 may be performed by a wireless communication device operating as or within a STA, such as one of the STAs 104 and 604 described above with reference to FIGS. 1 and 6B, respectively. In other implementations, the process 1510 may be performed by a wireless communication device operating as or within an AP, such as one of the APs 102 and 602 described above with reference to FIGS. 1 and 6A, respectively.

In some implementations, the process 1510 begins in block 1511 with calculating a number of initial pre-FEC padding bits based on an initial number of CRC bits ($N_{CRC}$). In block 1512, the process 1510 proceeds with calculating the number of LDPC codewords of length 1944. In block 1513, the process 1510 proceeds with updating the number of CRC bits based on the number of LDPC codewords. In block 1514, the process 1510 proceeds with recalculating the number of pre-FEC padding bits based on the updated number of CRC bits. If the number of CRC bits has changed (from the number of CRC bits previously calculated), the process 1510 proceeds to block 1512. Conversely, if the number of CRC bits has not changed (such that NCRC has converged to a particular number), the process 1510 proceeds to block 1515 with updating the number of payload bits to be transmitted in the PPDU. In block 1516, the process 1510 proceeds with computing the number of shortening zero bits.

The calculations in each step of the encoding process 1510 are described in greater detail in the Appendices, with the following modifications (in SU PPDU transmissions):

In block 1511, the initial number of CRC bits can be calculated based on the number of payload bits carried in the PPDU (APEP_LENGTH), the number of bits in the service field (N_SERVICE), the code rate (R), the number of codewords per codeword group (N), and the length of CRC sequence (n):

$$N_{CRC} = \left\lceil \frac{8 \times \text{APEP\_LENGTH} + \text{N\_SERVICE}}{NR - n} \right\rceil \times n$$

In block 1511, the initial number of pre-FEC padding bits ($N_{PAD1,Pre-F}$) can be calculated by first computing the number of bits left in the last OFDM symbol(s) ($N_{Excess}$), and further computing the number of initial data OFDM symbols ($N_{SYM1,init}$):

$$N_{Excess} = \text{mod}(8 \times \text{APEP\_LENGTH} + \text{N\_SERVICE} + N_{CRC},$$
$$m_{STBC} N_{DBPS1})$$

$$N_{SYM1,init} = m_{STBC} \left\lceil \frac{8 \times \text{APEP\_LENGTH} + \text{N\_SERVICE} + N_{CRC}}{m_{STBC} N_{DBPS1}} \right\rceil$$

$$N_{PAD1,Pre-F} = (N_{SYM1,init} - m_{STBC}) N_{DBPS1} +$$
$$m_{STBC} N_{DBPS1,LAST,init} - 8 \times \text{APEP\_LENGTH} + \text{N\_SERVICE} + N_{CRC}$$

In block 1513, the updated number of CRC bits can be calculated based on the number of LDPC codewords in the PPDU ($N_{CW1}$) and the number of codewords per group (N):

$$N_{CRC} = \left\lceil \frac{N_{CW_1}}{N} \right\rceil \times n$$

In block 1515, after the number of CRC bits converges, $$\text{APEP\_LENGTH} + \frac{N_{CRC}}{8}$$

will replace APEP_LENGTH in the L_LENGTH calculation in L-SIG.

In block 1516, the ($N_{pld,1,2,g-1}$+$N_{pld,1,2,g}$) payload bits, for the $g^{th}$ group of N codewords, includes ($N_{pld,1,2,g-1}$+$N_{pld,1,2,g}$−n) bits from the MAC payload plus an n-bit CRC derived from the corresponding portion of the MAC payload. For the last codeword group $$\left(g = \left\lceil \frac{N_{CW_1}}{N} \right\rceil \right),$$

there are $$\left(N_{CW_1} - \left\lfloor \frac{N_{CW_1}}{N} \right\rfloor \times N \right)$$

codewords and the payload bits include the remainder of the MAC payload bits plus an n-bit CRC derived from the corresponding portion of the MAC payload. In some implementations, each n-bit CRC sequence may be derived from, and appended to, the corresponding portion of the MAC payload to form the remaining payload bits for a group of N codewords.

Although the modified calculations have been described with respect to SU PPDU parameters, similar modifications can be made to the encoding of MU PPDUs. Since MU transmissions are user-dependent, each of the MU PPDU parameters (including APEP_LENGTH and $N_{CRC}$) may have a subscript u for the $u^{th}$ user.

Figure 15C:
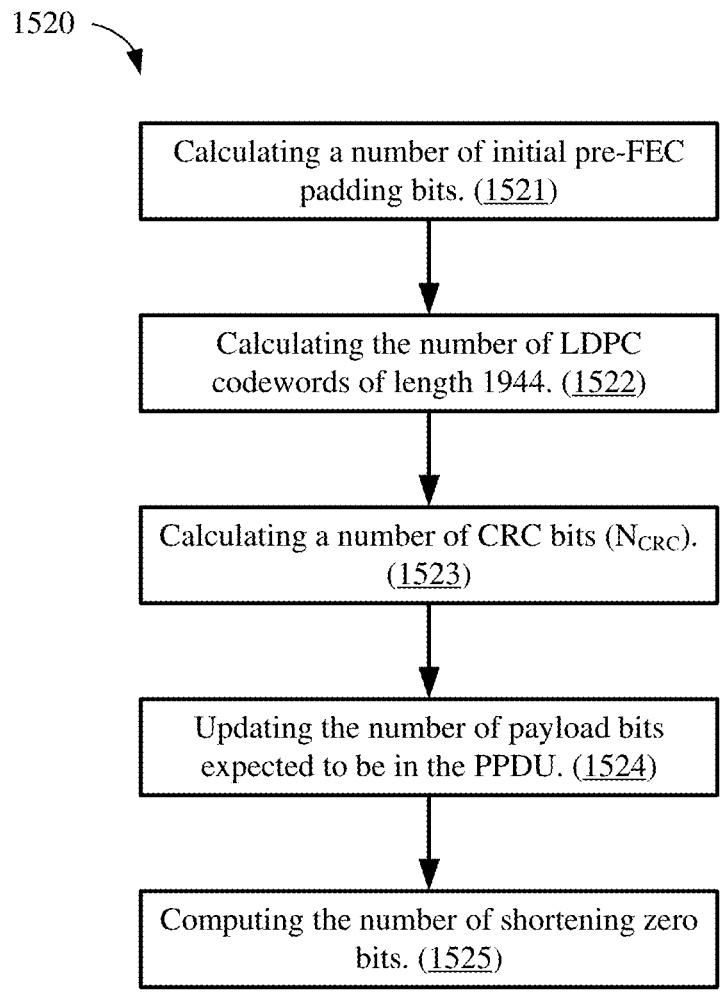
FIG. 15C shows a flowchart illustrating a decoding process with pre-FEC CRC according to the configuration of FIG. 15A.

FIG. 15C shows a flowchart illustrating a decoding process 1520 with pre-FEC CRC according to the configuration 1500 of FIG. 15A. The process 1520 may be performed by a wireless communication device such as the wireless communication device 500 described above with reference to FIG. 5. In some implementations, the process 1520 may be performed by a wireless communication device operating as or within a STA, such as one of the STAs 104 and 604 described above with reference to FIGS. 1 and 6B, respectively. In other implementations, the process 1520 may be performed by a wireless communication device operating as or within an AP, such as one of the APs 102 and 602 described above with reference to FIGS. 1 and 6A, respectively.

In some implementations, the process 1520 begins in block 1521 with calculating a number of initial pre-FEC padding bits. In block 1522, the process 1520 proceeds with calculating the number of LDPC codewords of length 1944. In block 1523, the process 1520 proceeds with calculating a number of CRC bits ($N_{CRC}$). In block 1524, the process 1520 proceeds with updating the number of payload bits expected to be in the PPDU. In block 1525, the process 1520 proceeds with computing the number of shortening zero bits.

The calculations in each step of the decoding process 1520 are described in greater detail in the Appendices, with the following modifications (in SU PPDU transmissions):

In block 1521, the initial number of pre-FEC padding bits ($N_{PAD1,Pre-F}$) can be calculated by first computing the number of bits left in the last OFDM symbol(s) ($N_{Excess}$), and further computing the number of initial data OFDM symbols ($N_{SYM1,init}$):

$$N_{Excess} = \text{mod}(8 \times \text{APEP\_LENGTH} + \text{N\_SERVICE},$$
$$m_{STBC}N_{DBPS1}$$

$$N_{SYM1,init} = m_{STBC} \left\lceil \frac{8 \times \text{APEP\_LENGTH} + \text{N\_SERVICE}}{m_{STBC}N_{DBPS1}} \right\rceil$$

$$N_{PAD1,Pre-F} = (N_{SYM1,init} - m_{STBC})N_{DBPS1} +$$
$$m_{STBC}N_{DBPS1,LAST,init} - 8 \times \text{APEP\_LENGTH} + \text{N\_SERVICE}$$

In block 1523, the number of CRC bits can be calculated based on the number of LDPC codewords in the PPDU ($N_{CW1}$), the number of codewords per group (N), and the length of the CRC sequence (n):

$$N_{CRC} = \left\lceil \frac{N_{CW1}}{N} \right\rceil \times n$$

In block 1524, $$\text{APEP\_LENGTH} - \frac{N_{CRC}}{8}$$

will replace APEP_LENGTH in the L_LENGTH calculation in L-SIG.

In block 1525, the ($N_{pld,1,2,g-1} + N_{pld,1,2,g}$) payload bits, for the $g^{th}$ group of N codewords, includes ($N_{pld,1,2,g-1} + N_{pld,1,2,g} - n$) bits from the MAC payload plus an n-bit CRC derived from the corresponding portion of the MAC payload. For the last codeword group $$\left(g = \left\lceil \frac{N_{CW1}}{N} \right\rceil \right),$$

there are $$\left(N_{CW1} - \left\lfloor \frac{N_{CW1}}{N} \right\rfloor \times N \right)$$

codewords and the payload bits include the remainder of the MAC payload bits plus an n-bit CRC derived from the corresponding portion of the MAC payload. In some implementations, for each group of N codewords, the n-bit CRC sequence may be used to validate the corresponding portion of the MAC payload. The n-bit CRC sequences may be removed from the decoded bits that are passed from the PHY to the MAC.

Although the modified calculations have been described with respect to SU PPDU parameters, similar modifications can be made to the encoding of MU PPDUs. Since MU transmissions are user-dependent, each of the MU PPDU parameters (including APEP_LENGTH and $N_{CRC}$) may have a subscript u for the $u^{th}$ user.

The implementations described above, with reference to FIGS. 8A-15C, may improve HARQ performance by providing finer feedback granularity or partial feedback. More specifically, the implementations for aligning MPDUs with codeword boundaries in a PPDU or inserting CRC sequences into payload bits prior to LDPC encoding may be used for efficient HARQ feedback with certain granularity (e.g., an MPDU, or a codeword group of a certain size). Aspects of the present disclosure recognize that, because the maximum block ACK or HARQ feedback bitmap size is 1024 bits, it may be desirable to also cap the feedback size at 1024 bits. Assuming a codeword size of 1944, storing 5 bits per LLR, and a feedback bitmap size of 1024, the feedback granularity of a number (N) of codewords per group is related to memory size:

$$\text{Memory size}(MB) = 1944 \times 1024 \times N \times \left( \frac{5 \text{ bits per } LLR}{8 \text{ bits per byte}} \right) \times \frac{1}{(1024)^2} = 1.19N$$

Thus, a 1 MB memory limit for HARQ could support a feedback granularity of every codeword. Similarly, a 2 MB memory limit for HARQ could support a feedback granularity of every two codewords. Based on the equation above, an appropriate codeword group size could be derived for any memory size.

Figure 16:
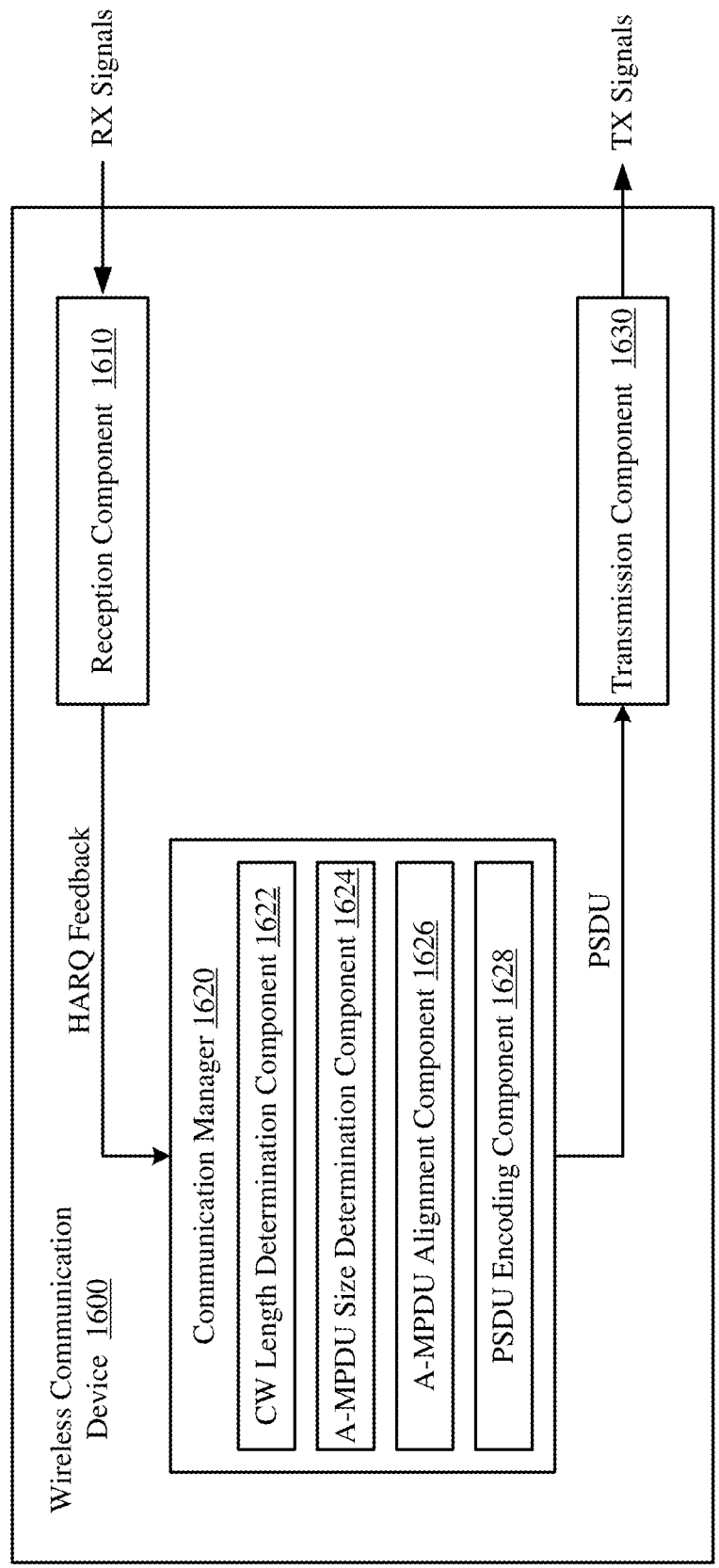
FIG. 16 shows a block diagram of an example wireless communication device according to some implementations.

FIG. 16 shows a block diagram of an example wireless communication device 1600 according to some implementations. In some implementations, the wireless communication device 1600 is configured to perform any of the processes 800, 810, 820, or 830 described above with reference to FIGS. 8A, 8B, 8C, and 8D, respectively. In some implementations, the wireless communication device 1600 can be an example implementation of the wireless communication device 500 described above with reference to FIG. 5. For example, the wireless communication device 1600 can be a chip, SoC, chipset, package or device that includes at least one processor and at least one modem (for example, a Wi-Fi (IEEE 802.11) modem or a cellular modem).

The wireless communication device 1600 includes a reception component 1610, a communication manager 1620, and a transmission component 1630. The communication manager 1620 may further include a codeword (CW) length determination component 1622, an A-MPDU size determination component 1624, an A-MPDU alignment component 1626, and a PSDU encoding component 1628. Portions of one or more of the components 1622, 1624, 1626 and 1628 may be implemented at least in part in hardware or firmware. In some implementations, at least some of the components 1622, 1624, 1626, or 1628 are implemented at least in part as software stored in a memory (such as the memory 508). For example, portions of one or more of the components 1622, 1624, 1626, and 1628 can be implemented as non-transitory instructions (or "code") executable by a processor (such as the processor 506) to perform the functions or operations of the respective component.

The reception component 1610 is configured to receive one or more RX signals from another wireless communication device. In some implementations, the RX signals may include HARQ feedback associated with data transmitted to the other wireless communication device. The communication manager 1620 is configured to encode the data as a PSDU for transmission to the other wireless communication device. In some implementations, the CW length determination component 1622 may determine a codeword length to be used for encoding the PSDU, the A-MPDU size determination component 1624 may determine a size of an A-MPDU subframe to be included in the PSDU, the A-MPDU alignment component 1626 may align the A-MPDU subframe with one or more codewords of the PSDU, and the PSDU encoding component 1628 may encode the PSDU, including the A-MPDU, as one or more codewords having the determined codeword length. The transmission component 1630 is configured to transmit the PSDU, as one or more TX signals, to other wireless communication devices.

Figure 17:
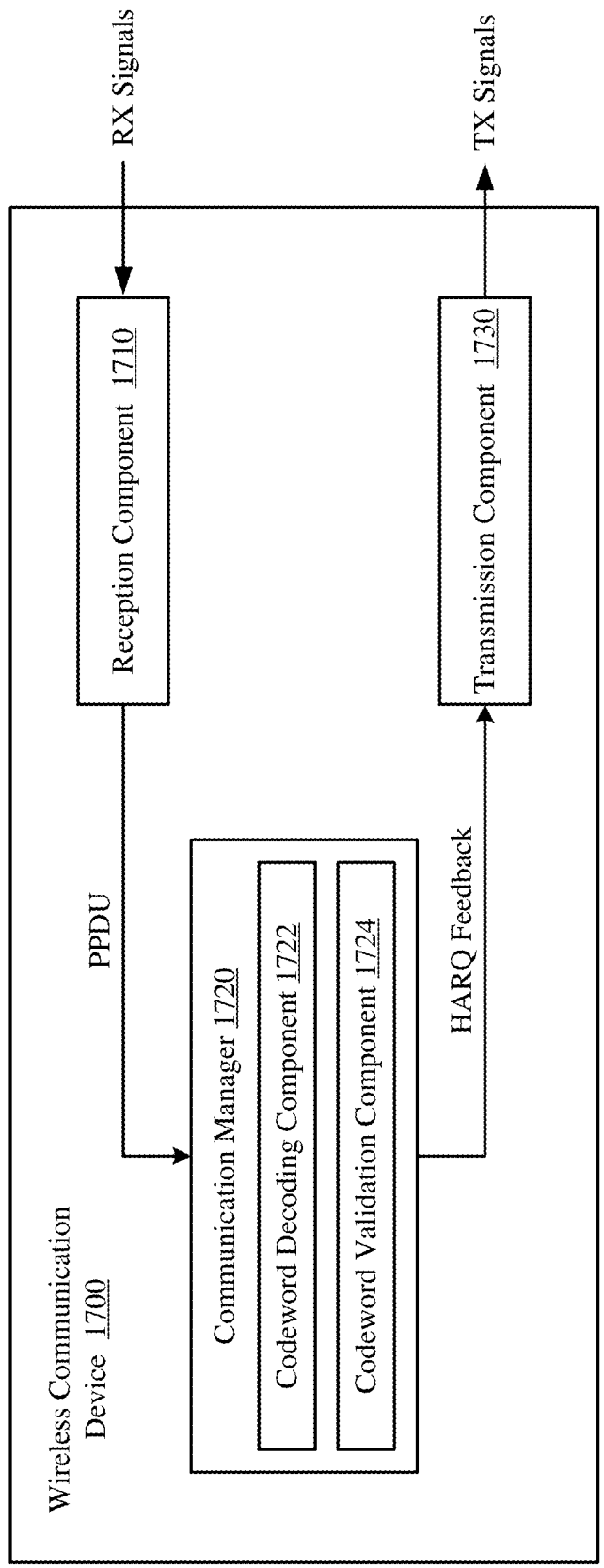
FIG. 17 shows a block diagram of an example wireless communication device according to some implementations.

FIG. 17 shows a block diagram of an example wireless communication device 1700 according to some implementations. In some implementations, the wireless communication device 1700 is configured to perform any of the processes 900 or 910 described above with reference to FIGS. 9A and 9B, respectively. In some implementations, the wireless communication device 1700 can be an example implementation of the wireless communication device 500 described above with reference to FIG. 5. For example, the wireless communication device 1700 can be a chip, SoC, chipset, package or device that includes at least one processor and at least one modem (for example, a Wi-Fi (IEEE 802.11) modem or a cellular modem).

The wireless communication device 1700 includes a reception component 1710, a communication manager 1720, and a transmission component 1730. The communication manager 1720 may further include a codeword decoding component 1722 and a codeword validation component 1724. Portions of one or more of the components 1722 and 1724 may be implemented at least in part in hardware or firmware. In some implementations, at least some of the components 1722 or 1724 are implemented at least in part as software stored in a memory (such as the memory 508). For example, portions of one or more of the components 1722 and 1724 can be implemented as non-transitory instructions (or "code") executable by a processor (such as the processor 506) to perform the functions or operations of the respective component.

The reception component 1710 is configured to receive one or more RX signals from another wireless communication device. In some implementations, the RX signals may include a PPDU including one or more codewords. The communication manager 1720 is configured to recover data provided in the PPDU. In some implementations, the codeword decoding component 1722 may decode the received codewords to recover a payload of the PPDU, where the decoded codewords include one or more CRC sequences, and the codeword validation component 1724 may validate the decoded codewords, in a PHY layer of the wireless communication device 1700, based on the one or more CRC sequences. The transmission component 1630 is configured to transmit one or more TX signals to other wireless communication devices. In some implementations, the TX signals may include HARQ feedback associated with one or more of the decoded codewords.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
   determining a codeword length to be used for encoding a physical-layer service data unit (PSDU);
   determining a size of a first aggregate medium access control (MAC) protocol data unit (A-MPDU) subframe to be included in the PSDU, the first A-MPDU subframe including a first MAC protocol data unit (MPDU);
   aligning the first A-MPDU subframe with two or more contiguous codewords of a plurality of codewords of the PSDU, the alignment of the first A-MPDU including selectively adding one or more padding bits to the PSDU at a codeword boundary between the two or more contiguous codewords and a subsequent codeword of the PSDU, a quantity of the one or more padding bits being based on the determined codeword length and the size of the first A-MPDU subframe; and
   encoding the PSDU, including the first A-MPDU subframe, into the plurality of codewords, including the two or more contiguous codewords, such that each codeword of the plurality of codewords has the determined codeword length, the two or more contiguous codewords including the first A-MPDU subframe, and no portions of any other A-MPDU subframe, based on the alignment.

2. The method of claim 1, wherein the selective adding of the one or more padding bits to the PSDU comprises:
   inserting the padding bits between two or more A-MPDU subframes associated with the PSDU.

3. The method of claim 1, wherein the padding bits comprise one or more MPDU delimiters or a known bit sequence.

4. The method of claim 1, further comprising:
   aggregating a plurality of MSDUs into the first MPDU based on the determined codeword length.

5. The method of claim 1, wherein the encoding of the PSDU comprises:
   generating one or more cyclic redundancy check (CRC) sequences based on a plurality of payload bits associated with the PSDU, the one or more CRC sequences being encoded with the plurality of payload bits to produce the plurality of codewords.

6. The method of claim 5, further comprising:
   grouping the plurality of codewords into one or more codeword groups, the one or more CRC sequences including a respective CRC sequence for each of the one or more codeword groups.

7. A wireless communication device comprising:
   at least one modem;
   at least one processor communicatively coupled with the at least one modem; and
   at least one memory communicatively coupled with the at least one processor and storing processor-readable code that, when executed by the at least one processor in conjunction with the at least one modem, is configured to:
      determine a codeword length to be used for encoding a physical-layer service data unit (PSDU);
      determine a size of a first aggregate medium access control (MAC) protocol data unit (A-MPDU) subframe to be included in the PSDU, the first A-MPDU subframe including a first MAC protocol data unit (MPDU);
      align the first A-MPDU subframe with two or more contiguous codewords of a plurality of codewords of the PSDU, the alignment of the first A-MPUD including selectively adding one or more padding bits to the PSDU at a codeword boundary between the two or more contiguous codewords and a subsequent codeword of the PSDU, a quantity of the one or more padding bits being based on the determined codeword length and the size of the first A-MPDU subframe; and
      encode the PSDU, including the first A-MPDU subframe, into the plurality of codewords, including the two or more contiguous codewords, such that each codeword of the plurality of codewords has the determined codeword length, the two or more contiguous codewords including the first A-MPDU subframe, and no portions of any other A-MPDU subframe, based on the alignment.

8. The wireless communication device of claim 7, wherein the selective adding of the one or more padding bits comprises:
   inserting the padding bits between two or more A-MPDU subframes associated with the PSDU, the padding bits including one or more MPDU delimiters or a known bit sequence.

9. The wireless communication device of claim 7, wherein execution of the processor-readable code is further configured to:
   aggregate a plurality of MSDUs into the first MPDU based on the determined codeword length.

10. The wireless communication device of claim 7, wherein the encoding of the PSDU comprises:
    generating one or more cyclic redundancy check (CRC) sequences based on a plurality of payload bits associated with the PSDU, the one or more CRC sequences being encoded with the plurality of payload bits to produce the plurality of codewords.

11. The wireless communication device of claim 10, wherein execution of the processor-readable code is further configured to:
    group the plurality of codewords into one or more codeword groups, the one or more CRC sequences including a respective CRC sequence for each of the one or more codeword groups.

* * * * *